US008011615B2

(12) United States Patent
Silansky et al.

(10) Patent No.: US 8,011,615 B2
(45) Date of Patent: Sep. 6, 2011

(54) INTERNET LINKED ENVIRONMENTAL DATA COLLECTION SYSTEM AND METHOD

(75) Inventors: Edward R. Silansky, Warrenton, VA (US); Harry Darlington, IV, Marshall, VA (US); Kenneth E. Burton, Jr., Jacksonville Beach, FL (US); Sandra Silansky, Warrenton, VA (US)

(73) Assignee: Sky Innovations, Inc., Warrenton, VA (US)

(*) Notice: Subject to any disclaimer, the term of this patent is extended or adjusted under 35 U.S.C. 154(b) by 0 days.

(21) Appl. No.: 12/292,018

(22) Filed: Nov. 10, 2008

(65) Prior Publication Data

US 2011/0006153 A1     Jan. 13, 2011

Related U.S. Application Data

(63) Continuation of application No. 11/125,148, filed on May 10, 2005, now Pat. No. 7,611,092, and a continuation of application No. 10/976,842, filed on Nov. 1, 2004, now Pat. No. 7,150,430, and a continuation of application No. 09/522,903, filed on Mar. 10, 2000, now Pat. No. 6,811,113.

(51) Int. Cl.
*B64B 1/02* (2006.01)

(52) U.S. Cl. ........................................ 244/30

(58) Field of Classification Search .................. 244/30, 244/94, 97, 190, 93, 115, 33; 114/297
See application file for complete search history.

(56) References Cited

U.S. PATENT DOCUMENTS

| 977,555 A | 12/1910 | Schmiechen |
| 1,076,060 A | 10/1913 | Preston |
| 1,430,868 A * | 10/1922 | Weyrick ................ 417/226 |
| 1,522,946 A | 1/1925 | Durr |

(Continued)

FOREIGN PATENT DOCUMENTS

DE          372646        6/1920

(Continued)

OTHER PUBLICATIONS

Werner Knaupp, Zentrum fuer Sonnenenergie-und Wasserstoff—Forschung (ZSW), Stuttgart for *Solar Powered Airship—Challenge and Chance* Oct. 5, 1993.

(Continued)

*Primary Examiner* — Tien Dinh
(74) *Attorney, Agent, or Firm* — Breneman & Georges

(57) ABSTRACT

An environmental data collection system and method is provided having an internet link for providing an additional level of security for a remotely controlled data collection platform having a security alarm for protecting the platform and the environmental subject of the study. A novel lighter-than-air platform having a novel snorkel for detachably securing, mooring and providing buoyancy control is provided for the collection of data in the form of real time audio and video linked to the internet and subscribers. The novel snorkel is flexible and retractable into the novel airship to provide remote buoyancy control of the airship together with silently operating electrical motors for allowing the novel airship to be remotely controlled and moved at will to track and monitor wildlife and make environmental measurements necessary for the protection of the environment, wildlife and the operation of the novel airship. Detachable securing means provide an anti-tethering feature of the novel airship and allow the collection of data from both, an aerial perspective and a ground perspective, while providing for the collection of data from either the surface of the earth or below the surface of the water while transmitting the data to scientists, environmentalists and subscribers through the internet.

15 Claims, 23 Drawing Sheets

U.S. PATENT DOCUMENTS

| | | | | |
|---|---|---|---|---|
| 1,848,372 | A | 3/1932 | Moran | |
| 1,935,672 | A | 11/1933 | Settle | |
| 1,977,392 | A | 10/1934 | MacKenzie | |
| 2,161,739 | A | 6/1939 | Duerr | |
| 2,983,950 | A | 5/1961 | Winker | |
| 3,945,589 | A | 3/1976 | Crompton | |
| 4,009,850 | A | 3/1977 | Hickey | |
| 4,089,492 | A | 5/1978 | Lang | |
| 4,204,656 | A | 5/1980 | Seward, III | |
| 4,431,994 | A | 2/1984 | Gemin | |
| 4,445,643 | A * | 5/1984 | Thorsby et al. | 239/745 |
| 4,705,303 | A | 11/1987 | van Aspert | |
| 4,846,093 | A | 7/1989 | Norena | |
| 5,034,759 | A | 7/1991 | Watson | |
| 5,115,997 | A | 5/1992 | Peterson | |
| 5,124,915 | A | 6/1992 | Krenzel | |
| 5,143,322 | A | 9/1992 | Mason | |
| 5,260,702 | A | 11/1993 | Thompson | |
| 5,509,624 | A | 4/1996 | Takahashi | |
| 5,511,482 | A | 4/1996 | DiPietropolo | |
| 5,517,201 | A | 5/1996 | Thompson, Jr. | |
| 5,518,205 | A | 5/1996 | Wurst | |
| 5,537,928 | A | 7/1996 | Schneider | |
| 5,538,203 | A | 7/1996 | Mellady | |
| 5,734,335 | A | 3/1998 | Brogi et al. | |
| 5,757,157 | A | 5/1998 | Falk et al. | |
| 5,778,259 | A | 7/1998 | Rink | |
| 5,794,125 | A | 8/1998 | Grad | |
| 5,826,020 | A | 10/1998 | Randell | |
| 5,890,676 | A | 4/1999 | Coleman et al. | |
| 5,991,808 | A | 11/1999 | Broder et al. | |
| 6,006,159 | A | 12/1999 | Schmier et al. | |
| 6,010,093 | A * | 1/2000 | Paulson | 244/24 |
| 6,026,502 | A | 2/2000 | Wakayama | |
| 6,119,979 | A | 9/2000 | Lee et al. | |
| 6,173,332 | B1 | 1/2001 | Hickman | |
| 6,205,320 | B1 | 3/2001 | Coleman | |
| 6,275,774 | B1 | 8/2001 | Baron, Sr. et al. | |
| 6,799,740 | B2 * | 10/2004 | Heller et al. | 244/136 |

FOREIGN PATENT DOCUMENTS

| | | |
|---|---|---|
| DE | 367589 | 7/1921 |
| GB | 191 419 A | 1/1923 |
| WO | WO 97 15992 A | 5/1997 |
| WO | WO 97 33790 A | 9/1997 |

OTHER PUBLICATIONS

Elfes A., et al. for *A Semi-Automatic Robotic Airship for Environmental Monitoring Missions* Leuven, BE, May 16-20, New York, NY: IEEE, US, vol. Conf.15, 1998, pp. 3449-3455F.

Ramos J.G. et al. for *A Software Environment for an Autonomous Unmanned Airship* IEEE/ASME International Conference on Advanced Intelligent Mechatronics.

Final Program and Abstracts, Sep. 19, 1999.

* cited by examiner

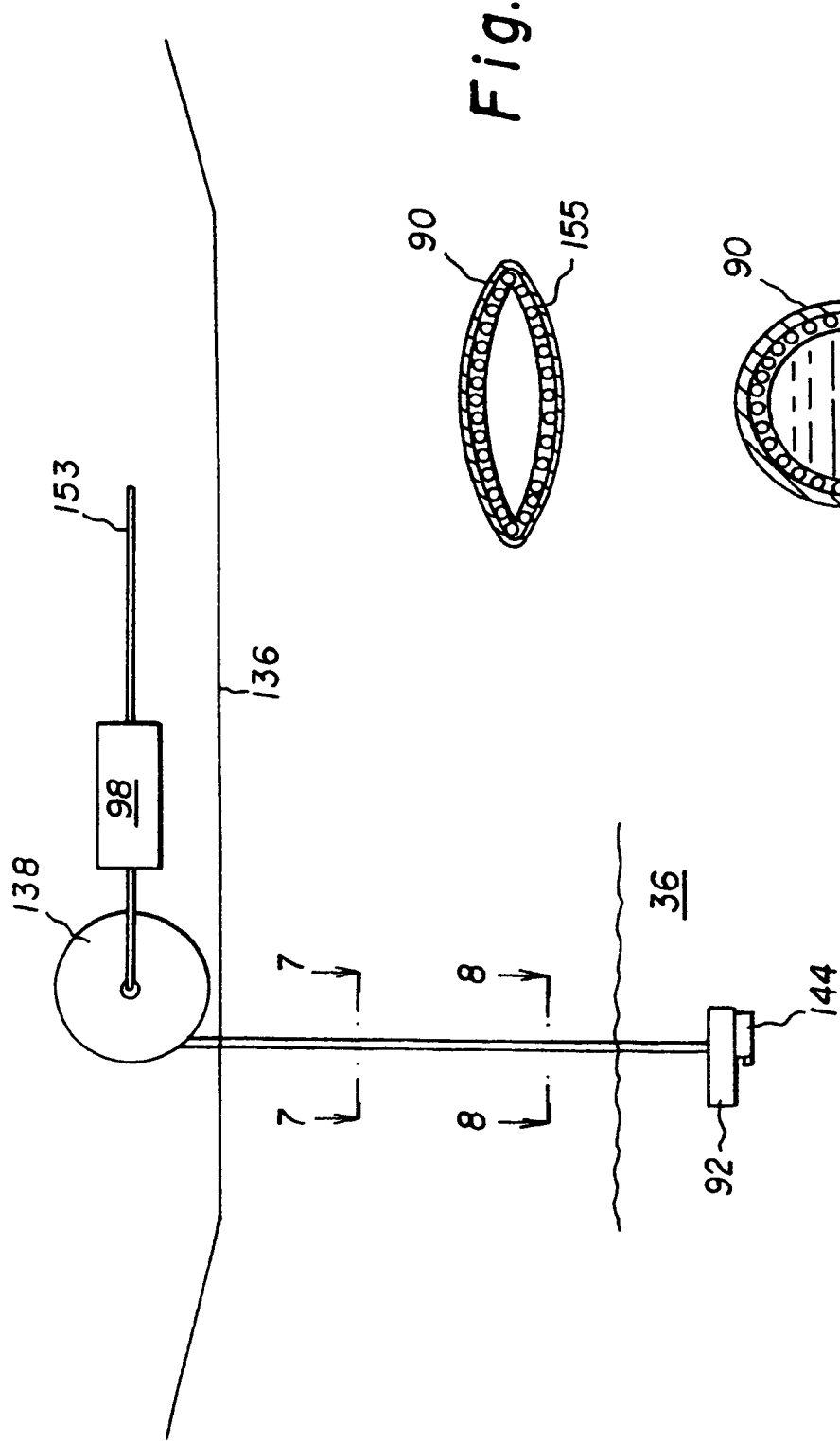

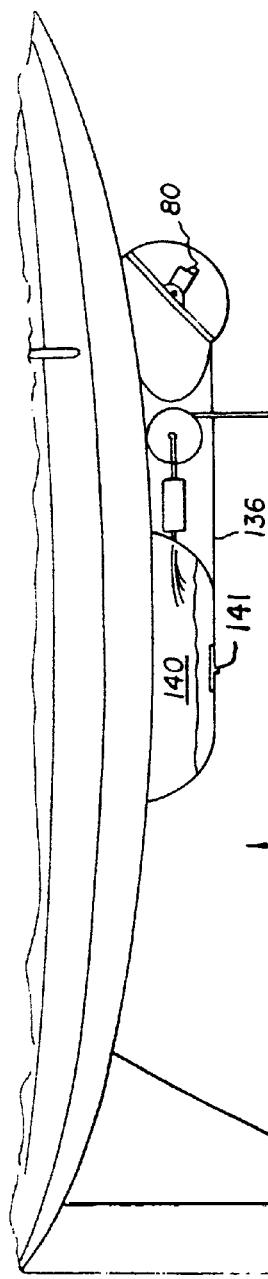
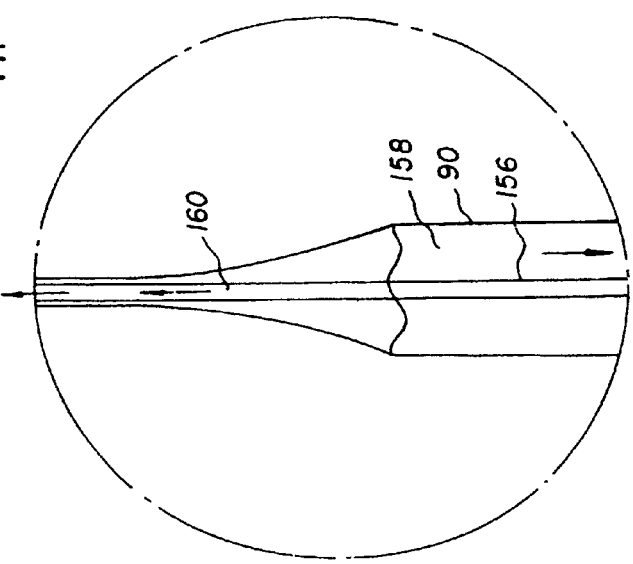

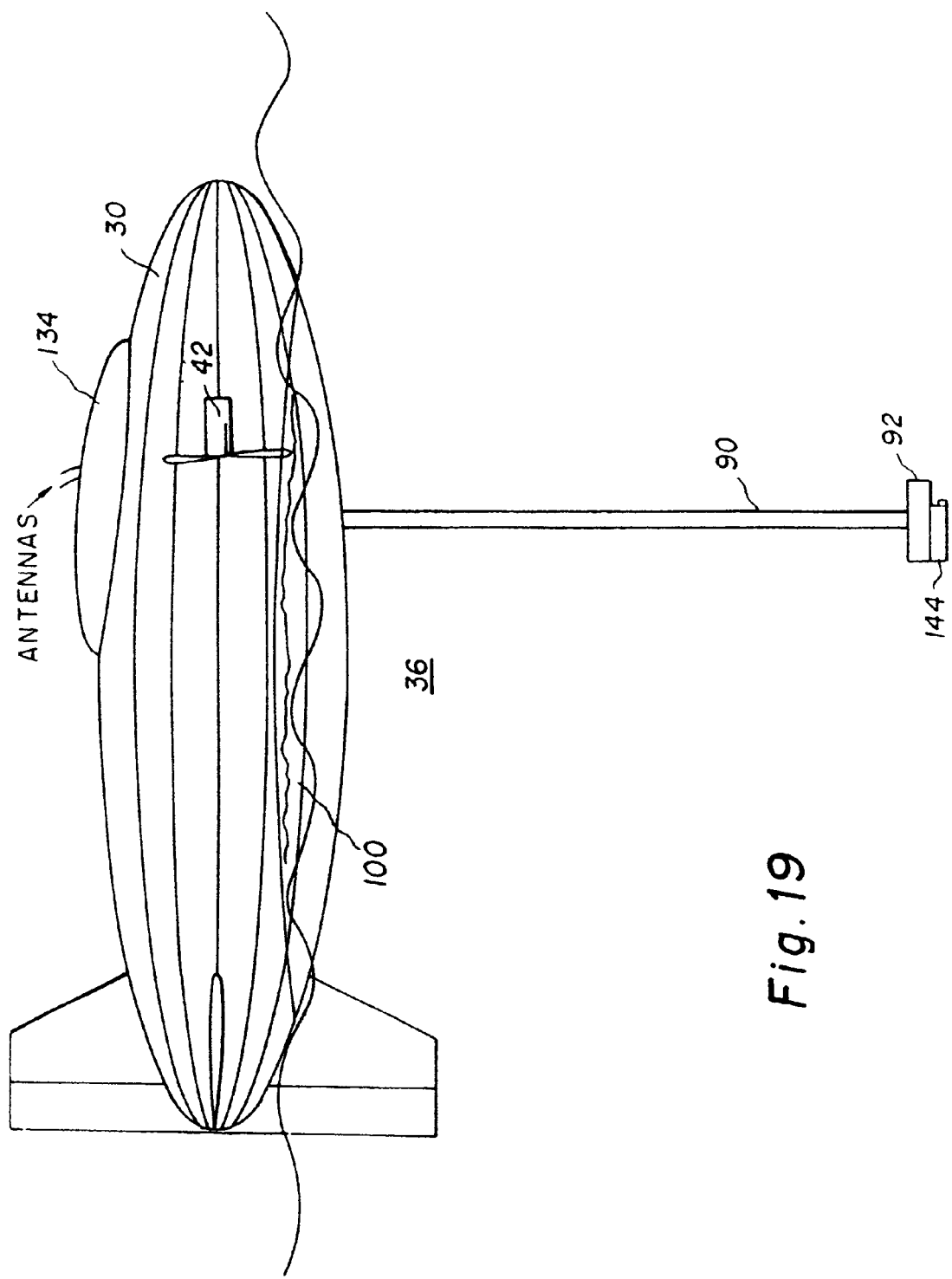

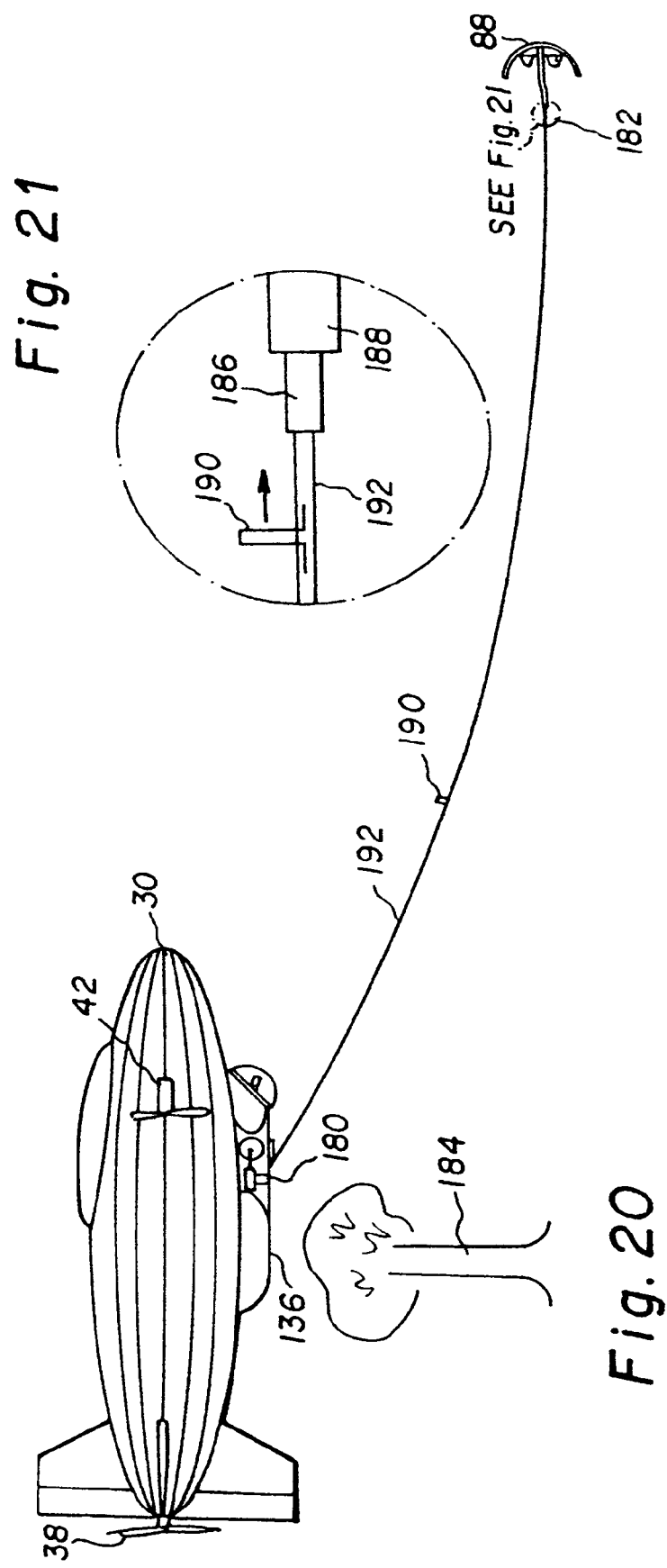

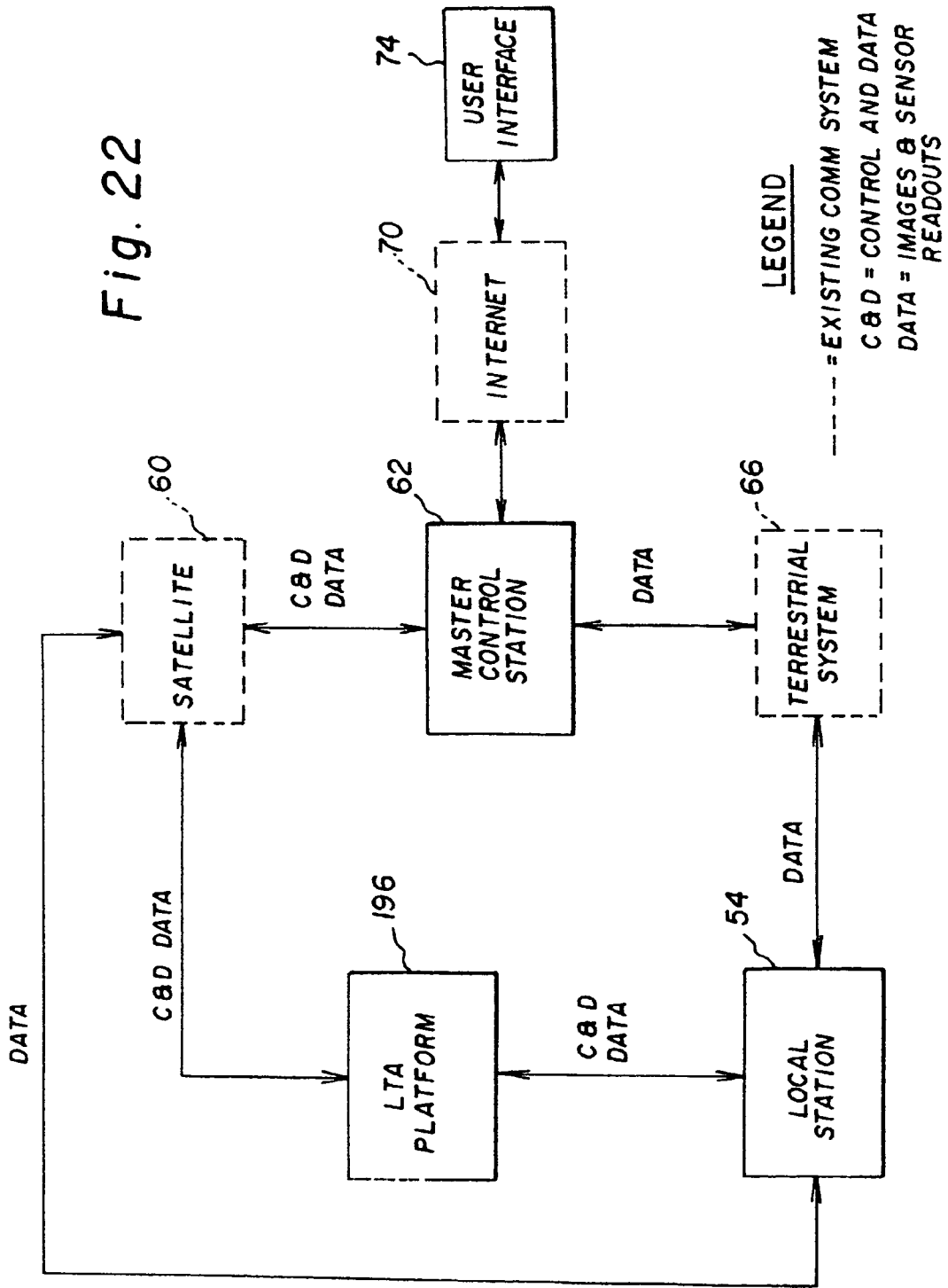

INTERNET LINKED ENVIRONMENTAL DATA COLLECTION SYSTEM AND METHOD

CROSS REFERENCE TO RELATED APPLICATIONS

This application is a continuation application of prior application Ser. No. 11/125,148 filed on May 10, 2005 now U.S. Pat. No. 7,611,092 and of application Ser. No. 10/976,842 filed on Nov. 1, 2004 now U.S. Pat. No. 7,150,430 and of application Ser. No. 09/522,903 filed on Mar. 10, 2000 now U.S. Pat. No. 6,811,113.

BACKGROUND OF THE INVENTION

1. Field of the Invention

The invention pertains to an environmental monitoring system utilizing a novel lighter-than-air aircraft having observation cameras and a water ballonet and snorkel system to provide a low altitude environmental observation platform with a security system. More particularly the invention pertains to an electrically powered lighter-than-air aircraft capable of silently hovering at low altitudes of about 5 meters (16.4 feet) to 1,500 (4,921 feet) and moving on command from one area to another to observe and track plant and animal life while providing security to the subject of the study and the novel lighter-than-air aircraft by providing an internet link to concerned subscribers and to local officials and observers.

The novel lighter-than-air aircraft includes a novel buoyancy control system for safely maintaining an untethered or detachably secured lighter-than-air aircraft in close proximity to the ground and for protecting the remote-controlled lighter-than-air airship from local weather conditions. The novel buoyancy control system includes a water ballonet in combination with a snorkel for not only controlling buoyancy but also for temporarily mooring or securing the novel low altitude lighter-than-air airship directly on the surface of a body of water larger than the airship to prevent damage to the lighter-than-air airship.

The novel lighter-than-air airship includes an anti-tethering camera connected to the airship with an anti-tethering cable for making surface and underwater observations. A second anti-tethering camera may also be attached to the end of the novel snorkel for making underwater observations in the vicinity of the snorkel. Both cameras for contacting the surface of the earth as well as cameras mounted in the novel lighter-than-air airship may be used to provide real time data and observations for an environment or ecosystem under study.

The novel lighter-than-air airship provides a dynamic study of the environment or an ecosystem by allowing an 'on the fly' definition and redefinition of the subject of the study. This 'on the fly' ability is a result of the ability of the novel lighter-than-air airship to silently hover for long periods of time at a particular location and also its ability to move with the herd or to other areas at the will of the scientists or remote observers without disturbing the wildlife while providing data and information simultaneously from both a ground and an aerial perspective.

The novel system and method of the invention also provides a security system for the environment by providing an early warning of poachers or other agents or deleterious factors on the environment by utilizing security cameras tied to the internet and local officials responsible for monitoring the environment. The data provided not only allows an instantaneous warning of immediate danger to the environment to a local monitoring station and to concerned groups through the internet but also long term data on trends and problems through a longer term analysis provided by a master monitoring station. The local and master monitoring stations can also include bidirectional communications links to allow interested local and remote observers to control cameras and move the novel lighter-than-air airship to track other problems or influences upon the studied environment or ecosystem.

2. Description of the Related Art Including Information Disclosed Under 37 CFR 1.97 and 1.98

Current technology available for monitoring and surveying an ecosystem, habitat or animal group consists of satellites, airplanes and ground observation. Satellite technology is not only expensive but at from about 1,400 km (868 ml) to 36,000 km (22,320 ml) above the earth satellites provide only an overall image of large ecosystems such as the Brazilian rain forest or the African savannah. Geostationary satellites are too far away to provide detailed images of smaller areas of interest such as a lion pride or poaching area.

Medium and Low Earth Orbit (MEO & LEO) satellites orbit closer to the earth and hence can provide more detailed images but they cannot provide continuous coverage because they are constantly circling the earth and only pass over a particular area of interest several times a day. Further, clouds and the heavy moisture content of the air above rain forests obscure the view of even high-resolution sensors by scattering their signals. Further, satellites are a shared resource. The technology is currently too expensive and sophisticated to be specifically configured, or deployed, to monitor just one area of interest.

Airplanes fly closer to the subject of interest and thus provide more detailed images but the noise from their engines disturbs the animals and their exhaust pollutes the environment. An airplane could be dedicated to monitor a specific area of interest but not for 24 hours a day because they have to return to their base to refuel and change crews. Further airplanes suffer the disadvantage of having to constantly move and cannot hover to monitor an area of interest. Use of airplanes or even a helicopter to monitor an area of interest would be very costly proposition, especially in the remote areas of the world where most of the ecosystems or habitats of interest are.

Ground observations, performed by scientists and volunteers, currently provides the most detailed data and images available, but it is impractical and expensive to devote large numbers of trained personnel to monitor specific areas of interest over long periods of time. Ground observations are also limited by the inability to obtain a bird's eye view of the entire ecosystem and to define and redefine the area of study based upon a multi-point relational vantage point as can be accomplished by an airship that allows hovering over areas for extended periods of days and weeks but also allows periodic movement when desired as provided by remote-control and without the intervention of humans into the habitat. Further some ecosystems and subjects such as a rain forest canopy or lion pride are difficult and dangerous for people to monitor continuously over extended periods and others, such as a family of gorillas, may be affected by human observers.

Prior art ground surveillance and monitoring systems include Brogi, et al. U.S. Pat. No. 5,734,335 and Thompson U.S. Pat. No. 5,517,201. In Brogi, et al. U.S. Pat. No. 5,734,335 a forest fire surveillance and monitoring system having cameras and sensors are mounted on a moveable platform that allows movement over a range of positions covering 360 azimuthal degrees. In Thompson U.S. Pat. No. 5,517,201 a plurality of monitors are distributed throughout a wildlife habitat for providing information as to the location, date and time of the detection of wild game in the surveillance area.

Thompson U.S. Pat. No. 5,517,201 and Brogi, et al. U.S. Pat. No. 5,734,355 do not utilize a lighter-than-air platform or a telecommunications link to the Internet to protect the environment or wildlife. Further such prior art systems do not employ platforms that are moved through the environment by remote control and provide for the study of the environment simultaneously from the ground and from an elevated platform to provide a bird's eye view of the entire area. Further such prior art does not provide for an 'on the fly' perspective of the environment to allow the redefinition of the environment as data and new relationships between the wildlife and the environment are manifested in the course of data collection.

Recently much attention has focused on the panda wildlife population. It has been recently learned from studies that logging and loss of forest connecting areas between isolated groups of pandas have reduced the dwindling reclusive panda population. This data from ground based studies might have been appreciated earlier utilizing the method and system of the invention where data from both the ground and the air are simultaneously collected. Further the method and system of the invention allows not only the collection of data for prolonged periods from one spot, but also allows the novel lighter-than-air platform to move with the wildlife without human intervention or the necessity of moving blinds or camouflaged cameras and surveillance equipment. The novel method and system of the invention in providing mobility and data from both the ground and the air provides for the flexibility of recognizing and assessing new environmental relationships and mobility to study the new environmental factors.

A number of surveillance lighter-than-air platforms have been provided in the prior art for surveillance and observation of endangered forest fire areas and coasts. In Knaupp, et al. *Solar Powered Airship* Oct. 5, 1993 an airship with video camera utilizing an electric motor for propulsion is provided having two ballonets for buoyancy control. In Wurst, et al. U.S. Pat. No. 5,518,205 a separate water gondola is provided in a high altitude platform and in Peterson U.S. Pat. No. 5,115,997 a tethered surveillance airship is disclosed. None of the known prior art provides a lighter-than-air platform having a water ballonet in combination with a snorkel for providing buoyancy control.

In the course of the extensive research conducted leading to the invention it was discovered that a tethered airship presented numerous problems at the low altitudes of less than 25 meters (82 feet) due to the tendency of the airship in wind to nose dive into the ground unless supported by a ground mooring pole. To solve this problem the invention employs an untethered airship designed to continually fly in a geostationary position with detachable securing means such as a snorkel and a breakaway anchor along with anti-tethering ground cables to support cameras and ground equipment.

The novel lighter-than-air platform employs one or more electric engines with propellers for silent operation, solar cells and battery or fuel cell for power, a security system and a water ballonet and snorkel combination for providing for safely securing the novel lighter-than-air platform over large ponds, lakes or other areas of water. Neither Knaupp, et al., Wurst, et al. U.S. Pat. No. 5,518,205, Peterson U.S. Pat. No. 5,115,997 nor any of the other known prior art provides a snorkel water ballonet combination for controlling buoyancy and providing for the temporary anchorage of a lighter-than-air platform.

As will be recognized snorkels have been widely used to acquire air for submarines but have not been used to anchor or acquire water for buoyancy control for lighter-than-air airships. One of the more recent submarine snorkel references is Ferguson, et al. U.S. Pat. No. 4,611,551. U.S. Pat. No. 4,611,551 does not teach or suggest the novel airship snorkel combination of the invention.

Crompton U.S. Pat. Nos. 3,945,589 and Re 30,129 pertain to a lighter-than-air airship with a water ballonet and water scoops and wheels for providing an amphibious dirigible airship. Crompton U.S. Pat. Nos. 3,945,589 and Re 30,129 do not teach or suggest the use of a snorkel for allowing the airship to hover above water and maintain buoyancy control by drawing a column of water into the snorkel or providing for a smaller diameter snorkel within a snorkel to not only allow the airship to maintain an observation position above the water but also to allow the transfer of a portion of water through the smaller diameter snorkel within the snorkel into the water ballonet for reacquiring ballast and providing for buoyancy control. Further none of the prior art teaches or suggests the remote control of the airship and the remote control of buoyancy at low altitudes.

None of the known prior art provides a security system connected to the internet or provides for the combination of hovering and mobility for studying the environment. None of the known prior art provides for the flexibility of both aerial and ground based observation coupled with the ability to remotely control and move the observation platform and cameras as needed during the collection of data. None of the known prior art provides for the multi level of collection of data and the ability to redefine the environmental area of study as data and causal data links and information becomes available.

Unlike the prior art the invention pertains to an integrated system which links together via wireless communications any environment, ecosystem, habitat, or animal group with interested parties who wish to observe, monitor or study the particular ecosystem, habitat or animal group from not only the ground but also an aerial or top plan view to obtain a more complete understanding of the environment and its related links.

The interested parties may be scientists, environmentalists, children or any other person with an interest in the particular ecosystem, habitat, or animal group and hereinafter they will be referred to as subscribers. The subscribers not only obtain data from the wildlife or environment under study but also become part of the study and part of the security system for protecting the study. As part of the study, the subscribers are at times given access to control the cameras and provide input as to the scope of the study. As part of the security system the subscribers are linked by the Internet to the study in a real time communications link to assist in preventing damage to the lighter-than-air observation platform and to a particular ecosystem under study.

SUMMARY OF THE INVENTION

The invention provides a system and method for the study of the environment by subscribers linked together through the internet to provide a security system for protecting the environment. The system and method of the invention provides data from both the surface of the earth and from an aerial perspective to not only assist in providing data related to the study but also to assist in identifying and including factors outside the study that may have profound impacts upon the study. These advantages are achieved by not only utilizing the internet but also an observation platform that is remotely controlled and remotely moved when necessary to track, observe and when necessary to redefine boundaries of the ecosystem.

The advantages of the invention are provided by an untethered and preferably unmanned lighter-than-air airship having one or more electric engines with propellers for silent operation and solar cells for converting solar energy into electrical energy and one or more batteries or fuel cells for providing electrical energy. The novel lighter-than-air airship is preferably remotely controlled and includes a security system for protecting the lighter-than-air platform and for protecting the wildlife being studied. The security system also preferably includes cameras and telecommunications links to the Internet to assist in maintaining the system and the wildlife studied free from unauthorized intrusion.

In the best mode the invention includes a novel lighter-than-air airship having a buoyancy control system utilizing a water ballonet and a retractable snorkel for adding water to the water ballonet and providing for the temporary anchorage of the novel lighter-than-air airship over large ponds, lakes or bodies of water. The novel retractable snorkel not only allows the novel airship to maintain an observation position above animal watering holes but also to provide for the filling of the water ballonet to allow the novel airship to be secured on the surface of the water during storms to prevent the airship from being lost by being blown away in severe storms or from being blown into trees or rocks and being torn and destroyed on the ground.

The novel lighter-than-air airship snorkel and snorkel within a snorkel not only provides the ability to anchor the airship over water in times of severe weather but also allows water to be transferred from a nearby lake, river, stream or ocean onto the novel airship for buoyancy control. This buoyancy control can be remotely controlled and the volume of the column of water in the large diameter snorkel reduced as the amount of water drawn in the small diameter snorkel and drawn into the water ballonet is increased. Once the volume of water necessary for projected buoyancy control is obtained based on projected local weather conditions the novel airship can be moved to track the studied animals from the watering location to other areas of the ecosystem.

As the day progresses water may be released from the water ballonet to maintain neutral buoyancy after the hottest part of the day. During late afternoon and evening hours most if not all of the water in the water ballonet is released as the day cools into night and ballast is no longer required. In the morning the novel airship can follow the animals to the watering location to again reacquire sufficient ballast for the next day to accommodate the heating of the day so as to prevent undue energy from being expended in maintaining the airship at a predetermined altitude by operating the electrical engines.

The novel lighter-than-air aircraft may include an underwater camera at the end of the snorkel for not only observing aquatic wildlife such as whales and dolphins but also to provide depth data of the lake or pond to prevent the bottom of the snorkel from being entangled with debris at the bottom of the lake or pond. This underwater camera at the end of the snorkel may also be detachable from the snorkel and include remote control for moving the camera underwater. The underwater camera may also include an anti-tethering cable for separating the camera from the cable if the cable becomes tangled in debris. Similarly a second cable deployable camera aboard the airship for providing data and video from the surface of dry land may include an anti-tethering cable as well as a recovery system for recovering separated cameras sonic buoys or audio listening devices such as hydrophones.

The cameras on the snorkel and on cable together with cameras disposed on the novel lighter-than-air airship provide real time observation and data to subscribers who may be scientists, environmentalists or other interested parties desiring information and data on a particular ecosystem habitat or group of animals. The real time data collected by the novel lighter-than-air aircraft is transmitted through a wireless communications station to a local station which may be a fixed ground station, mobile station or to a satellite. Preferably the real time data is transmitted to a local ground station in the vicinity of the novel lighter-than-air aircraft which also maintains remote control operation over the novel lighter-than-air aircraft. In cases where a local ground station is not practical remote control of the novel airship may be controlled by satellite.

In the best mode of the invention the system includes an internet connection to subscribers and a master control station disposed between the local station and the internet connection. The function of the master station is to collect and compact real time continuously collected data into shorter viewable segments that highlight significant events over a shorter viewing period. The master control station operates on a substantially real time mode so that internet links between the subscriber and the master control station can be used to change camera vantage points and position of the novel lighter-than-air platform substantially contemporaneously with the broadcast over the internet taking into account the differences in time zones between the subscriber and the location of the lighter-than-air platform.

The best mode of the invention also includes a security system for protecting the observation platform and the subject of the study. The security system and method of the invention in the best mode is connected to the internet so that data obtained from a data acquisition means such as security cameras can be used on a real time basis to alert local officials, park rangers and subscribers of poachers or other deleterious factors jeopardizing the study as well as the equipment used to conduct the study.

In the preferred embodiment of the invention the following components are utilized:

I. A remote controlled Lighter-Than-Air (LTA) platform with data acquisition means in the form of a video, audio and data collection payload that records real time, live video and audio of the subject and collects physical and scientific measurement data of specific interest or importance to the subject environment such as temperature, rainfall, air or water pollution, habitat destruction, animal population or intruders as well as local weather important to the operation of the airship such as high and low temperature, hours of sunlight, barometric pressure, wind and other conditions bearing upon the operation of the LTA based upon actual and projected weather changes.

II. A wireless transmission system, which sends the video and data from the LTA platform to either, a local station which is preferably a local ground station in reasonable proximity of the platform or to a satellite. The local station also operates to remotely control the flight and operation of the remotely controlled LTA. Data transmitted from the local station in the form of real time video and audio are preferably sent to a master control station which assembles the data for transmission to secure websites on the internet.

III. Video, audio and data, once received by the satellite or master control station is stored, manipulated, categorized and indexed and transmitted to subscribers to enhance knowledge and interest in the subject.

IV. The video and data on the secure website in one embodiment of the invention is made available to subscribers who by use of a password log onto the website and have access to the live video and data as well as the ability to control aerial cameras, ground cameras and possibly the location of the LTA platform in conjunction with the master control station and the local station.

The LTA platform, cruising or hovering over an area of interest at an altitude of 5 to 1,500 meters, equipped with visible spectrum, infrared and multi-spectral video cameras with pan, tilt and zoom capability fitted with telephoto and wide angle lenses along with a GPS and data monitoring equipment provides a complete surveillance and study system that allows the constant, near real-time viewing and data collection of any ecosystem; habitat or animal population anywhere in the world from the subscriber's personal computer by simply logging onto the secure website.

The novel method and system is readily adaptable and can be remotely controlled and moved as necessary for scientific study, monitoring changes, protection of the ecosystem, habitat or animal, or for the purpose of enhancing general interest in the subject. The novel system, unlike known systems, provides a stationary platform that can move with the migratory patterns of the subject being studied and allows the continuous monitoring of the subject, 24-hours a day, 7-days a week, without human intrusion into the area of study. It is by continual monitoring that a real understanding of an ecosystem, its condition and the scope of factors that have an impact can be studied.

The LTA platform can optionally be equipped with a Global Positioning System, which will allow the subscriber to log onto the system, pull down a map of the exact location being viewed and track the movement of the subject animals or view exactly where the subject area is located in a given country. The map can also be used to track migratory routes and animal territorial patterns as they relate to the environment. Scientists and environmental experts generally accept that changes in one ecosystem probably have an effect on other ecosystems. The destruction of the rain forest probably impacts both contiguous and distant ecosystems. Melting ice flows may impact vegetation or other factors in other ecosystems. As with the example of the panda many times influences are subtle and need both an aerial and ground perspective as well as mobility within a particular ecosystem for evaluation.

The use of the novel system to define or move between multiple ecosystems while following and monitoring the subject of the ecosystem study as determined by scientists for the study provides a flexibility in tracking, measuring and monitoring a predetermined set of data that would track the general health of the ecosystem and specific changes to a specified number of variables. This data would be collected continuously over a long period of time and transmitted by the system to the secure website. There the data from the multiple sites would be loaded into special software that would analyze, measure and manipulate the data to determine any correlations or patterns that the data suggested. Continual monitoring, data collection and central data analysis from multiple ecosystems provides a tool for scientists to better understand the relationships among the ecosystems and how changes at one impacts other areas and the mobility to move from one site to another to monitor impact where the combination of ground and aerial data acquisition means such as cameras, listening devices and weather monitoring instruments provide insufficient perspective of the ecosystem within the footprint of the lighter-than-air platform.

The system and method of the invention also provides for certain specific applications not previously possible. By placing a non invasive collar on one of the animals in a given herd or animal group the entire herd or animal group can be tracked from the lighter-than-air platform for tracking along migratory routes since as a rule, the subjects move in herds or groups. The target animal can be tranquilized, and a collar placed upon it as is often currently done by various scientists and researchers. The collar sends out a signal which can be picked up by the payload sensors onboard the LTA platform and the system will command the various video, audio and data collection devices to record the herd or animal group that is being tracked.

For specific applications, the LTA platform can be outfitted with specific payloads that can collect data and send it back to the central website on:
  High-resolution images, either close up or panoramic views of the rain forest canopy, deforested areas, areas being cut, streams, vegetation, animal herd migration, or natural disasters in a given area.
  Measurement of both air and water pollution and the health of vegetation and biomass production.
  Environmental impact studies.
  Analysis of rock and mineral formations in remote areas for identifying natural resources.
  Monitoring crude oil pipelines for leaks and environmental damage.

The method and system of the invention can also link subscribers into action groups for protecting and possibly purchasing critical land areas from either private or public owners. The purchase of property in or around critical habitat areas and the placing of the property so purchased in an appropriate trust in order to protect said property could be an effective way to help mitigate destruction of the subject areas.

No known prior art system exists in which video and other relevant data of a remote property in and around a critical ecosystem or habitat is made available on the internet for possible protection or purchase by a group of subscribers that have been brought together on the master website. This application of the invention would serve to link individuals, corporate sponsor(s) and an environmental group(s) to form a virtual network of subscribers united in interest to study, preserve and protect the subject of the environmental study. This network would unify a group to promote dialog with the host country of the ecosystem, habitat or animal group, to government agencies and to international organizations in order to affect policy or create concern for the endangered ecosystem, habitat or animal group.

The system and method of the invention provides a 24-hours per day, 7-days per week real-time link between everything that is happening within a given ecosystem, habitat or animal group and subscribers and interested parties anywhere on the globe. For example, children will be able to watch the birth of lion cubs and view them daily as they grow to adulthood, all without human intervention.

BRIEF DESCRIPTION OF THE DRAWING

The objects and advantages of the invention will become more apparent to those skilled in the art from the following Description of the Preferred Embodiment in relation to the accompanying drawings in which:

FIG. 6 is an elevational view of the novel snorkel assembly in accordance with the preferred embodiment of the invention;

FIG. 7 is a sectional view of the novel airship snorkel taken along the lines 7-7 of FIG. 6;

FIG. 8 is a sectional view of the novel airship snorkel taken along the lines 8-8 of FIG. 6;

FIGS. 12, 12A and 12B are side elevational views of the novel lighter-than-air platform illustrating the operation of the novel airship snorkel of FIG. 10;

FIG. 19 is a side elevational view of the novel lighter-than-air platform in a protected mooring position utilizing the novel airship snorkel;

FIG. 20 is a side elevational view of the novel lighter-than-air platform with a detachable anchor means in the form of a breakaway land anchor;

FIG. 21 is an enlarged view of the breakaway portion of the land anchor of FIG. 20;

FIG. 22 is a diagrammatic illustration of the components of the novel system and method of the invention;

DESCRIPTION OF THE PREFERRED EMBODIMENT

The novel invention provides a stationary observation platform that is remotely controlled and can be moved at will which provides a video image with audio, environmental and scientific data collection and distribution system that links any ecosystem, habitat or animal group to subscribers anywhere in the world who wish to observe, monitor, study or protect the ecosystem, habitat or animal group of interest. Subscribers can access the video images, audio and data from a secure web site via the Internet after registering and entering a password that allows access. The novel method of the invention employs in the preferred embodiment a remotely controlled novel lighter-than-air platform or airship having a novel airship snorkel, novel anti-tethering cables and data acquisition means for preventing damage to the airship and providing for secure mooring in water in times of severe weather by utilizing one of the detachable securing means which is the novel airship snorkel.

Figure 1:
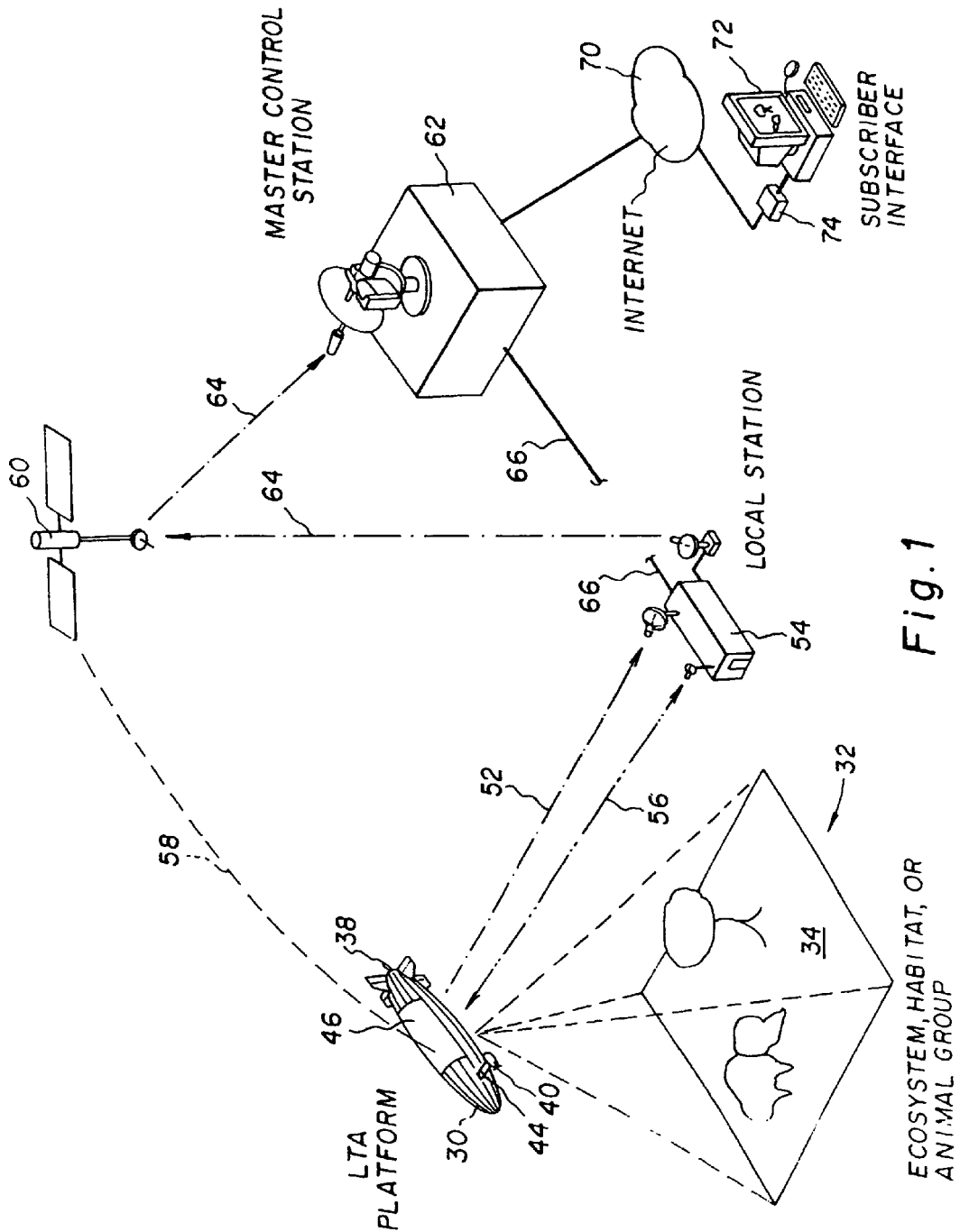
FIG. 1 is a schematic illustration of the novel internet linked environmental system and method in accordance with the preferred embodiment of the invention.
Figure 4:
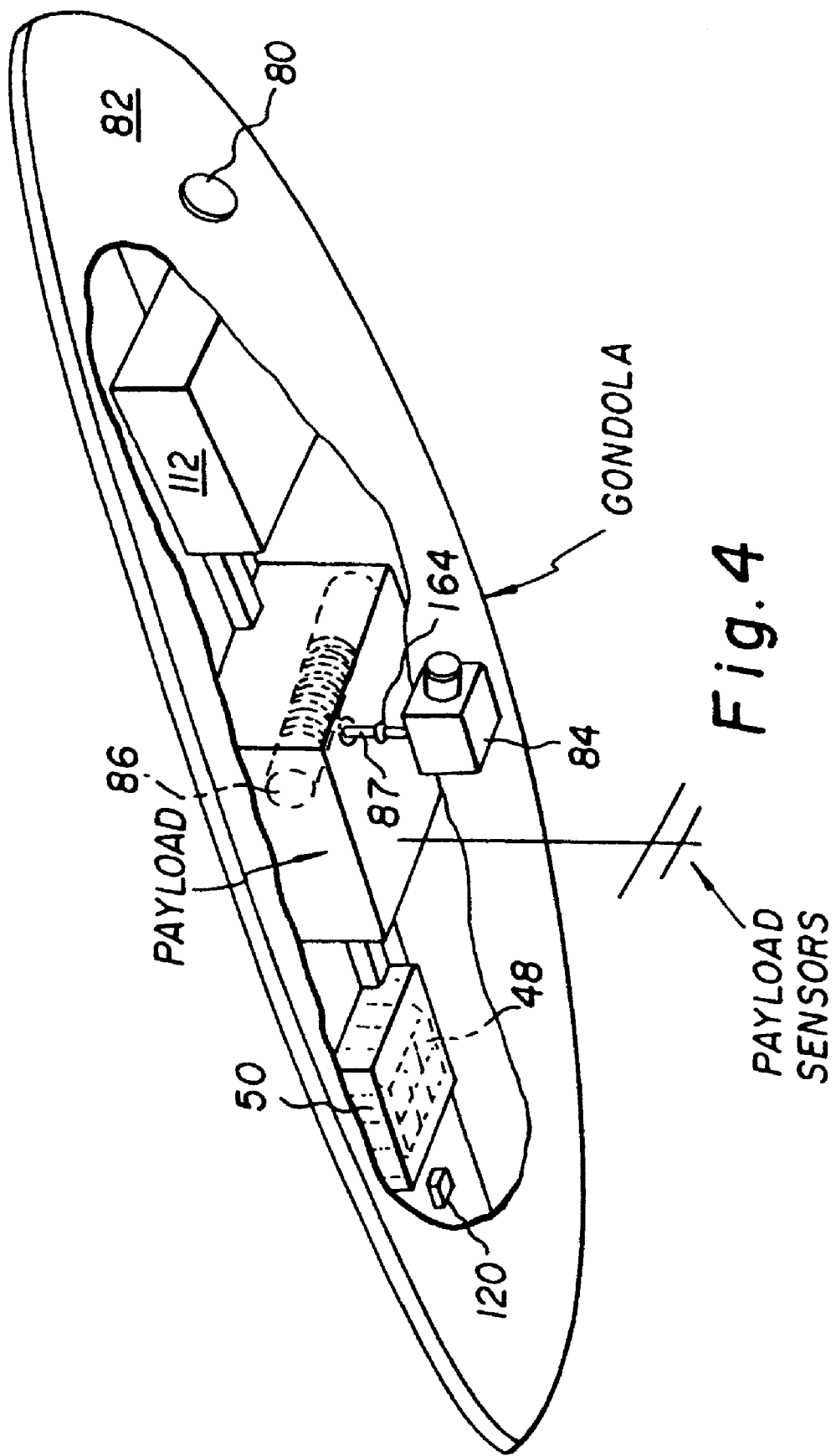
FIG. 4 is a perspective view partly in section illustrating electronic control components and data acquisition components in an instrument housing.
Figure 5:
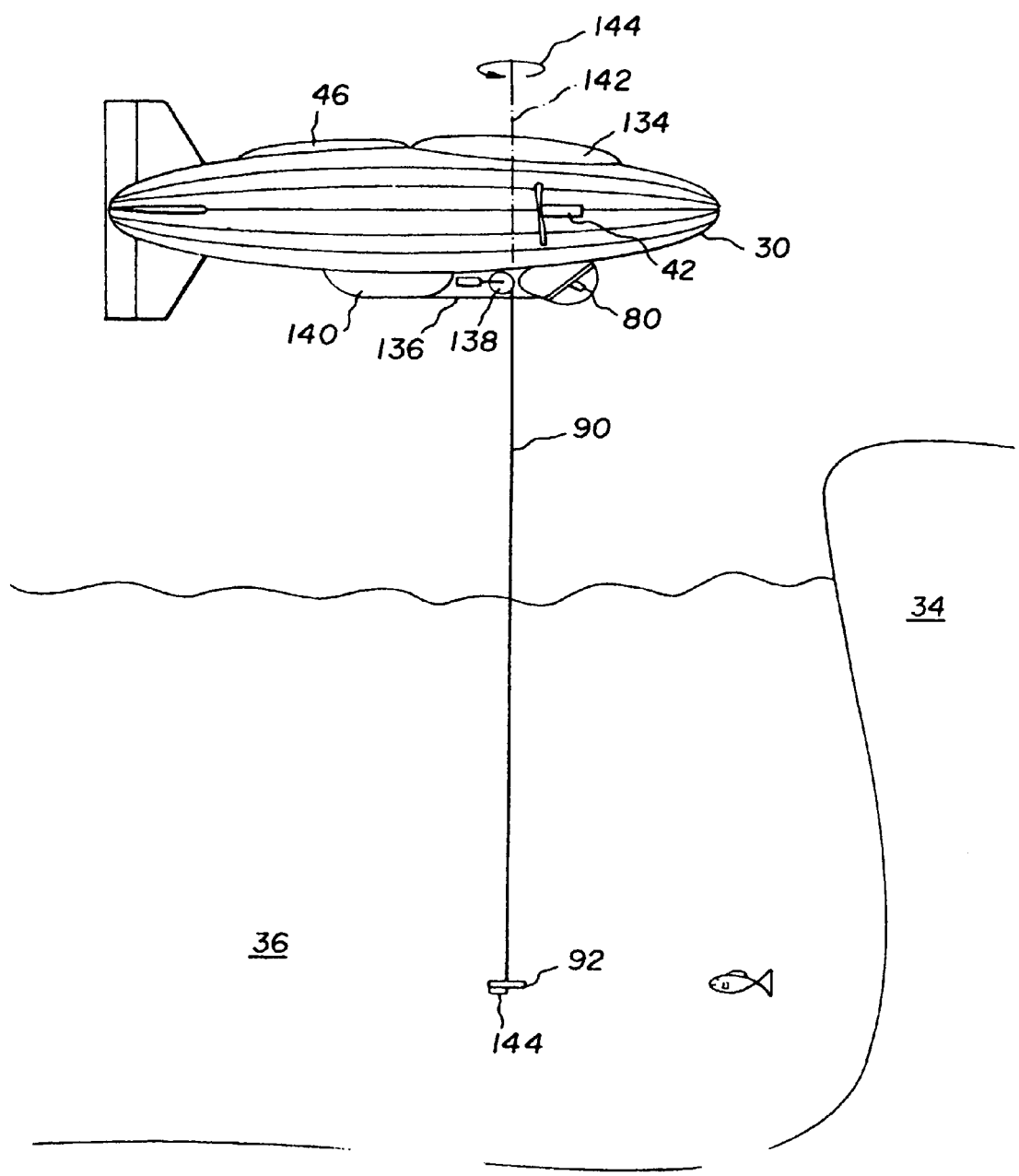
FIG. 5 is a side elevational view illustrating the novel lighter-than-air platform with a detachable anchor means in the form of a snorkel.

Referring to FIG. 1, the invention in its preferred embodiment utilizes an airship or Lighter-Than-Air (LTA) platform 30 due to its ability to silently hover over a site under study and its ability to move and track migrating animals and provide a platform for a data acquisition means to acquire data simultaneously from the surface of the earth 32 which may be either the ground 34 or at or below the surface of the ocean or water 36 (FIG. 5). As used herein the term lighter-than-air platform is used to describe an airship in which all or a substantial portion of the lift is provided by a lifting gas such as helium or hydrogen and as such includes hybrid aircraft in which the lift of the airship is supplemented by airfoils and/or engines. The airship 30 preferably employs an electrical engine 38 and two auxiliary electrical engines 40 and 42 (FIG. 2) which may be mounted on an airfoil stabilizer 44. Airship 30 also preferably includes a solar cell panel 46 for providing electrical power as well as batteries 48 in an electrical power supply compartment 50 (FIGS. 3, 4).

Figure 2:
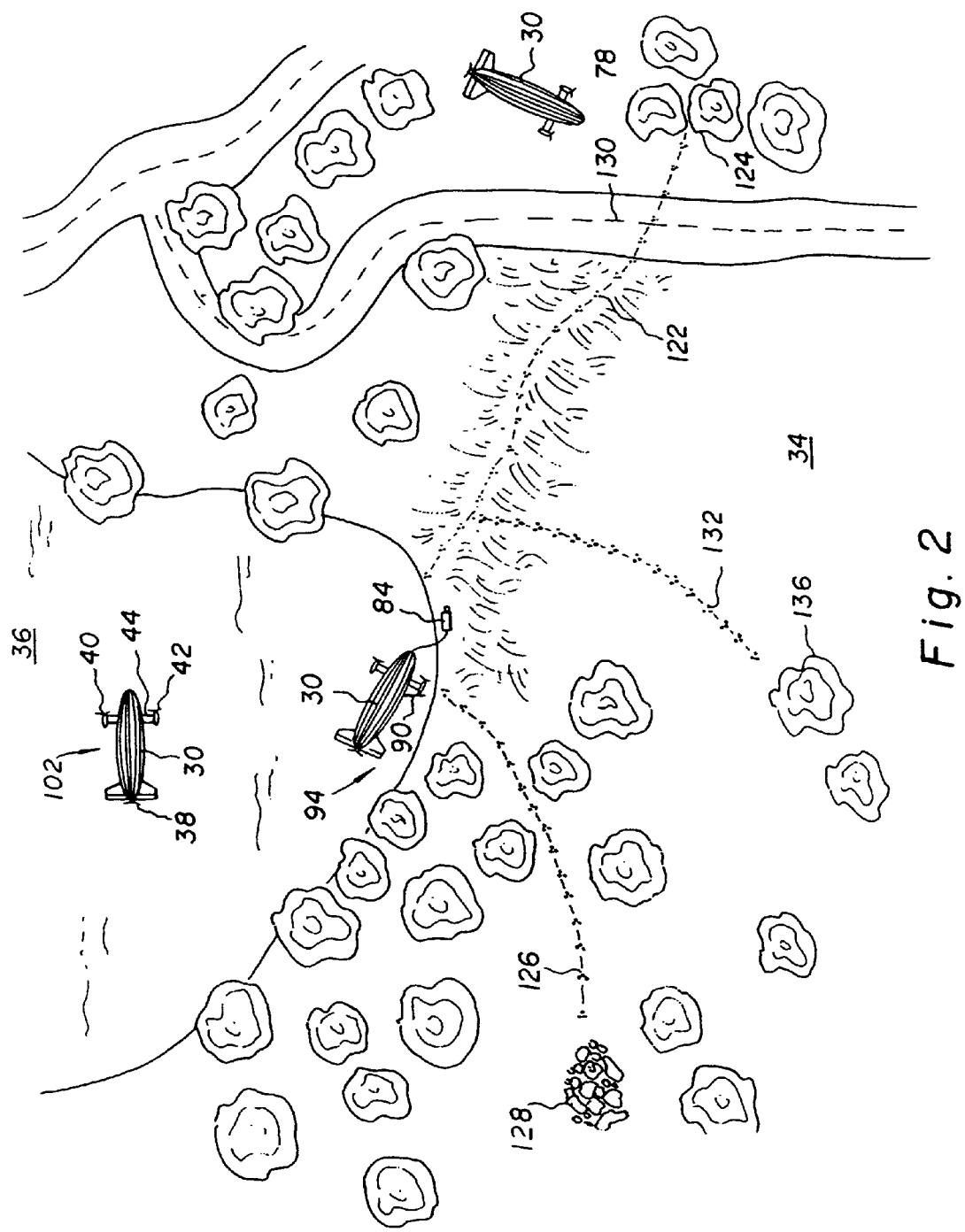
FIG. 2 is a top plan view of the earth illustrating an ecosystem and the remote control of a novel lighter-than-air platform for monitoring the environment in accordance with the invention.
Figure 3:
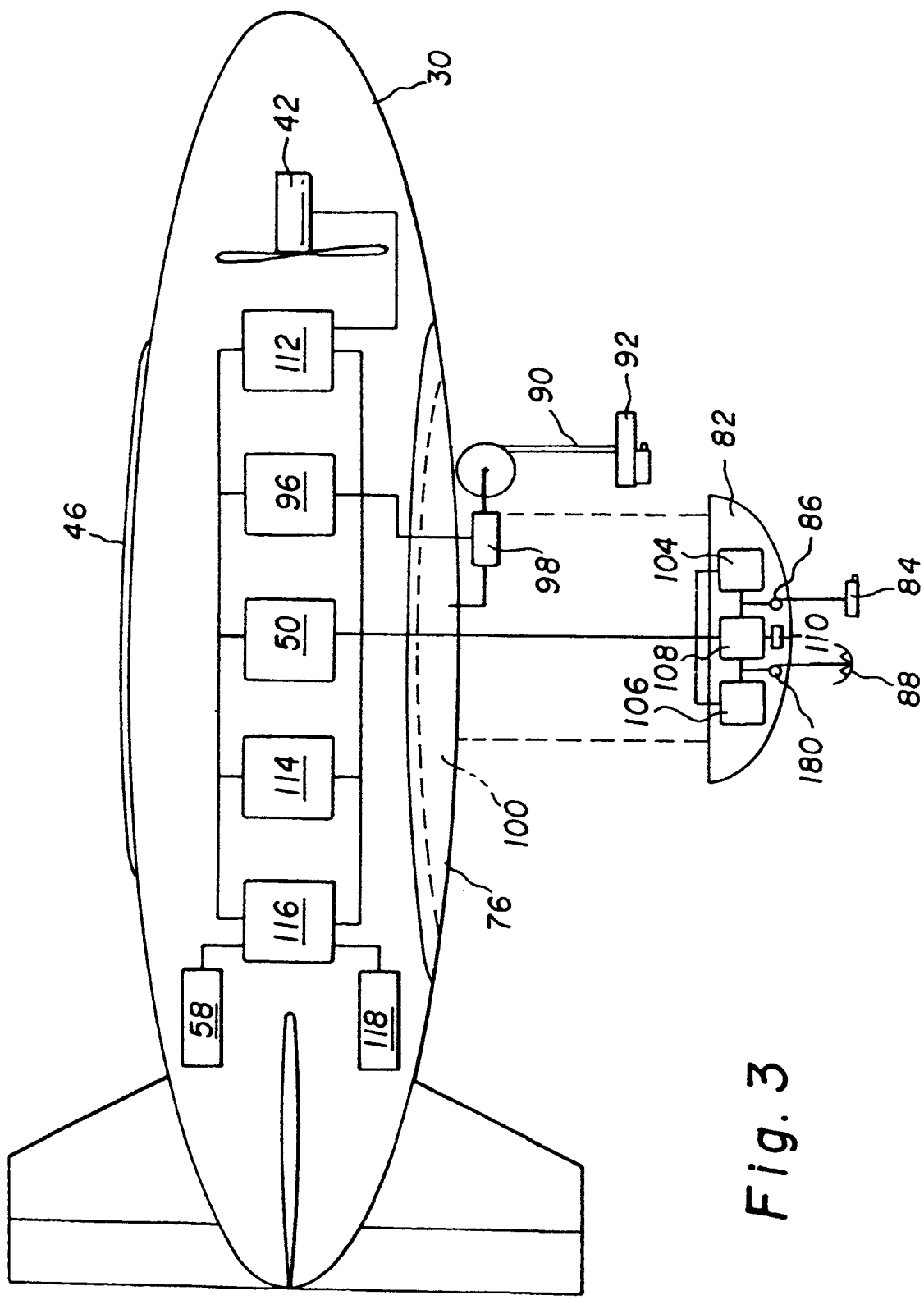
FIG. 3 is a diagrammatic view partially exploded illustrating the components of a novel lighter-than-air platform for providing data for the internet linked environmental system and method of the invention.

Referring now to FIGS. 1-3 airship 30 includes data acquisition means such as cameras and listening devices for acquiring data from a studied subject which data is preferably transmitted by a telecommunications link 52 to a local station 54. Local station 54 telemetry command and control link 56 (TC&C) is connected to airship 30 for remotely controlling the novel airship 30. Where remote control of airship 30 by local station 54 is not possible due to political problems airship 30 includes a satellite communications link 58 for communication and control through a satellite 60 from a remote master control station 62. Alternatively communication and control of airship 30 and the transfer of data from local station 54 may be accomplished through a satellite link 64 or through a terrestrial link 66. Data from the master control station in the preferred embodiment of the invention is transmitted by the master control station 62 through the internet 70 to a computer 72 through a subscriber internet interface 74.

Local station 54 may be either a fixed ground station, a mobile ground station or an airborne station for controlling lighter-than-air aircraft 30. Local station 54 is preferably in the vicinity of aircraft 30 for obtaining data on local weather conditions to provide a more effective control of aircraft as will be discussed hereinafter in greater detail. Master control station 62 is preferably disposed on the ground near a large city or area close to a number of subscribers. Master control station 62 may also be a mobile station.

Referring now to FIGS. 1-4 airship 30 is deployed in an environmental area of study which may be terrestrial and include any type of animal or ecosystem or may be water or ocean based and may include any type of reef or aquatic life utilizing the novel method and system of the invention. Airship 30 preferably operates silently employing electric engines and may include camouflaged exterior areas 76 to blend into the environment or ecosystem under study. Airship 30 can be maintained in a hovering constantly flying condition over an area 78 to observe wildlife from one or more pilot cameras 80 disposed in a payload housing 82. Cameras 82 are designed to provide aerial data for not only remotely controlling airship 30 but also for providing data for transmission of visual images of the environment from an aerial perspective.

Ground observations and data is provided by a remote controlled camera 84 that is deployable from payload housing 82. Payload housing 82 is preferably a watertight compartment when camera 84 is retracted by camera winch 86 by cable 87 into housing 82 and a detachable securing means in the form of a breakaway ground anchor 88 is retracted in housing 82 for reasons that will be discussed hereinafter in greater detail. A further detachable securing means in the form of a novel airship snorkel 90 having a water pump 92 for pumping water into snorkel 90 to provide for the detachable securement of airship 30 above water 36 is achieved in area 94 (FIG. 2) by controlling the volume of water pumped into snorkel 90.

Novel airship snorkel 90 not only provides one means for detachable securement of airship over water 36 but is also employed as part of the buoyancy control system 96 in the preferred embodiment of the invention to not only operate pump 92 to fill snorkel 90 and lower novel airship 30 but also to operate pump 98 to transfer water from snorkel 90 and into water ballonet 100 (FIG. 3). Water ballonet 100 in combination with snorkel 90 further allows novel airship 30 to be securely moored in water 36 in area 102 by flooding water ballonet 100 as illustrated in FIGS. 2 and 19. The secure mooring of novel airship 30 in water 36 can be utilized where severe thunderstorms or weather would threaten to blow airship 30 away or risk damage to smashing the airship into the ground.

On site weather information of projected temperature, barometric pressure and projected severe weather are obtained from a data acquisition means in the form of a multi spectral sensor unit 104 which not only receives data from the one or more aerial cameras 80 which are received by the video camera unit 106 and transmitted by transceivers 108 through antennae 110 to the local station to make flight decisions as to the operation of airship 30.

In normal operation novel airship 30 acquires data in the form of temperature, barometric pressure, wind conditions and on site weather observations which are compared to projected temperature, barometric pressure, wind conditions and projected temperature at the local station 54 to determine how much water should be transferred to water ballonet 100 for the buoyancy control system to effectively operate at the minimum power output needed for the day to operate electrical engines 38, 40 and 42.

For example, if the high temperature of the day is 60° F. and the coolest temperature is 40° F. little or no water may be needed to counteract the heating and resultant increase in lift in the lift gas. On the other hand, where the projected high temperature is 110° F. and the low temperature is 60° F., much more water may be taken into ballonet 100 so the airship takes off heavy but the total energy required to maintain the airship in position 78 (FIG. 2) during the day is less since the increase in lift resulting from heating is compensated by the additional volume of water. Thereafter as the heat of the day subsides and the lift gas cools, water is discharged from the novel airship through a valve or a ballonet release mechanism 141 (FIG. 12A). In this manner the detachable anchor means in the form of a snorkel controls the positive buoyancy to maintain the lighter-than-air aircraft at a predetermined maximum altitude and the ballast ballonet controls the negative buoyancy at a predetermined minimum altitude. The novel airship is designed to maintain a stationary position utilizing buoyancy control and engines 38, 40 and 42 with the breakaway ground anchor used only in no wind conditions. The operation of detachable anchor means in the form of breakaway ground anchor will be described hereinafter in greater detail.

Figure 25:
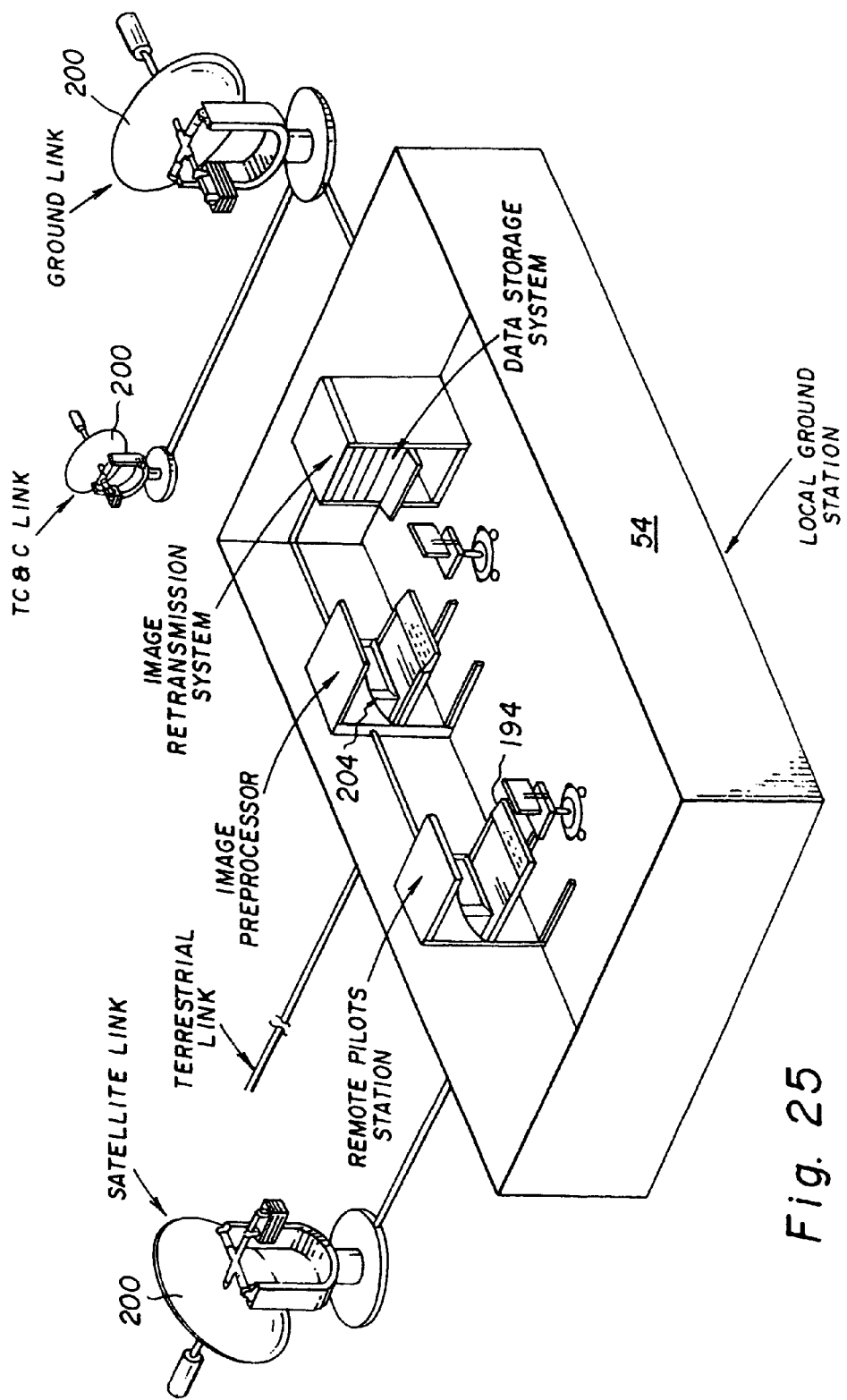
FIG. 25 is a perspective view of a local station constructed in accordance with a preferred embodiment of the invention.
Figure 26:
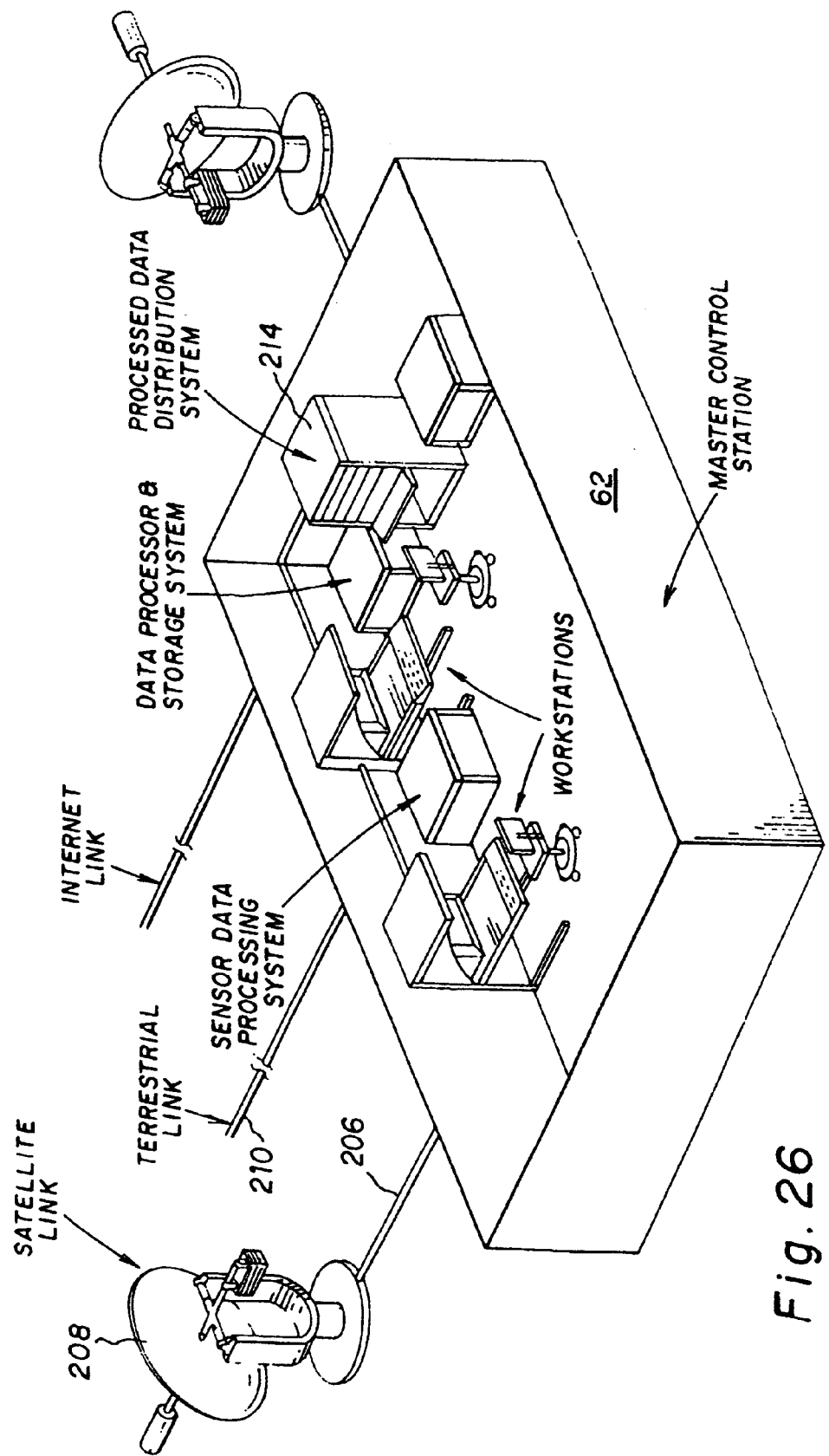
FIG. 26 is a perspective view of a master control station constructed in accordance with a preferred embodiment of the invention.

Novel airship 30 with the novel airship snorkel 90 may be manned or unmanned. Novel airship 30 in its preferred embodiment is unmanned and is remotely controlled by local station 54 and includes a radio controlled flight control system 112. Radio controlled flight system may be obtained from various sources including Bosch Aerospace of Huntsville, Alabama which employs radio controlled flight control systems for unmanned airships utilizing gasoline engines operating at higher altitudes. A propulsion system 114 is provided for maneuvering novel airship 30 using electrical engine 38, 40 or 42 which receives instructions through transceiver 108. A security system 116 is provided to protect novel airship 30 as well as the environment being studied from poachers or human tampering. The security system 116 includes sending wireless warning signals to local station 54 to alert local officials through a ground link 118 of unauthorized entry as well as alerting subscribers through the internet and transmitting video of violations through a satellite link as illustrated in FIGS. 1, 25 and 26. A crash alarm 120 (FIG. 4) provides immediate information as to the flight status of the novel airship 30.

Referring now to FIG. 2 the novel airship 30 provides data and a telecommunications station in the form of a local station 54 or master control station 62 can store data to identify patterns of an ecosystem from both an aerial perspective and a ground perspective. From an aerial perspective airship 30 obtains data as to migratory or daily paths taken by animals such as old cheetah path 122 from trees 124 to a source of water 36. Lion path 126 from rock area 128 may also be observed and their relationship mapped. As is known from studies lions will kill cheetahs and particularly their young since both cats compete for the same food.

The existence or planned existence of a new road 130 across old cheetah path 122 may force a new cheetah path 132 to trees 136 which due to proximity to rock area 128 may result in the loss of a cheetah population in the area. These relationships can not only be studied but steps can be taken to change roads or move animals to new ecosystems to preserve dwindling endangered species.

Referring now to FIGS. 4 to 12 the novel airship 30 and novel airship snorkel is illustrated in greater detail in which batteries 48, crash alarm 120, radio controlled flight system 112, antennae 113 and other electrical components are placed in instrument housing 134. Housing 136 is designed to accommodate retractable snorkel 90, spool 138 and a water ballonet 140. Snorkel 90 is preferably mounted in alignment with the axis running through the center of lift as represented by line 142 so that novel airship 30 is free to weathervane around line 142 as represented by arrow 143. In view of the fact novel airship 30 is designed to weathervane around line 142 it is rare to have both snorkel 90 deployed and camera 84 deployed as illustrated in FIG. 2 since weathervaning with snorkel 90 and camera 84 could result in a winding of the two cables. Only on calm days or under constant monitoring is it feasible to deploy two cables. As a result in most occasions camera 80 is utilized to take ground video and audio data. Alternatively camera 84 may be deployed and snorkel retracted while the airship hovers over the area by the operation of electrical engine 38.

The novel airship and novel snorkel are designed to operate in a variety of different environmental systems. The novel airship and novel snorkel arrangement are not only adapted for the study of terrestrial environments but also aquatic environments including marine studies of reefs and marine life. Snorkel 90 includes a pump 92 for providing a detachable securing means to the ocean with an underwater camera available to not only provide audio and visual data as to the ocean environment but also to provide data as to the depth and position of snorkel 90 in relation to debris in the water. As heretofore discussed the novel airship is not a tethered airship since tethering has been found to result in loss and destruction of the airship particularly when unpredictable winds blow the airship into objects such as rocks or trees. It is believed that uncontrolled contact between the airship and the surface of the water might not result in loss of the airship since the water generally does not contain trees, rocks or other sharp objects that would tear the skin of the airship. As a result all detachable securing means that contact land surfaces are designed to function as breakaway components as will be described hereinafter in greater detail.

Figure 9:
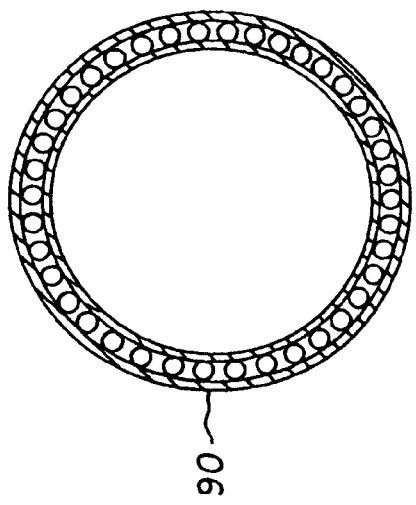
FIG. 9 is a sectional view of an alternative embodiment of the novel airship snorkel.
Figure 11:
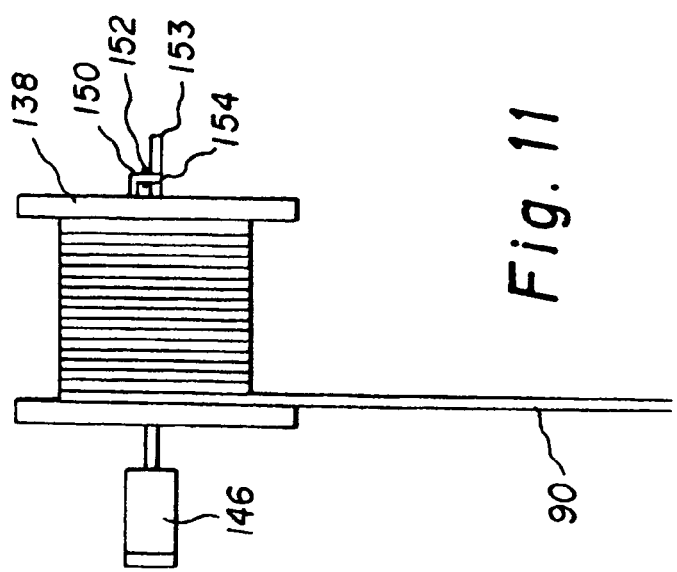
FIG. 11 is a front view of a spool assembly for deploying and retracting the novel flexible snorkel.

The novel retractable airship snorkel 90 carried on spool 138 is deployed and retracted by motor 146. Pump 92 is disposed on end 148 of retractable airship snorkel 90 and end 150 is attached by coupling to a swivel fitting 154 to conduit 153 which is connected to water ballonet 100 in airship 30 or to water ballonet 140 disposed in housing 136. Snorkel 90 is preferably of a flat configuration to assist in rolling snorkel 90 on spool 138. Snorkel 90 may be a rubber or elastomeric hose such as a fire supply hose of varying diameters as may be obtained from Angus Inc. of Angier, N.C. Preferably snorkel 90 is composed of hypalon or other hydrophobic elastomeric material that does not become waterlogged and includes reinforcing ribs 155 that assist in changing the configuration of snorkel 90 from a flat to a round configuration when water 36 is pumped into snorkel 90 by pump 92. Alternatively a round rubber or elastomeric hose composed of a hydrophobic material can be utilized for a snorkel 90 as illustrated in FIG. 9.

Figure 10:
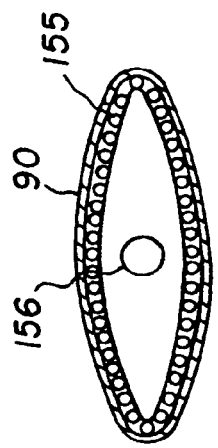
FIG. 10 is sectional view of the best mode of a novel airship snorkel in accordance with the invention.
Figure 12:
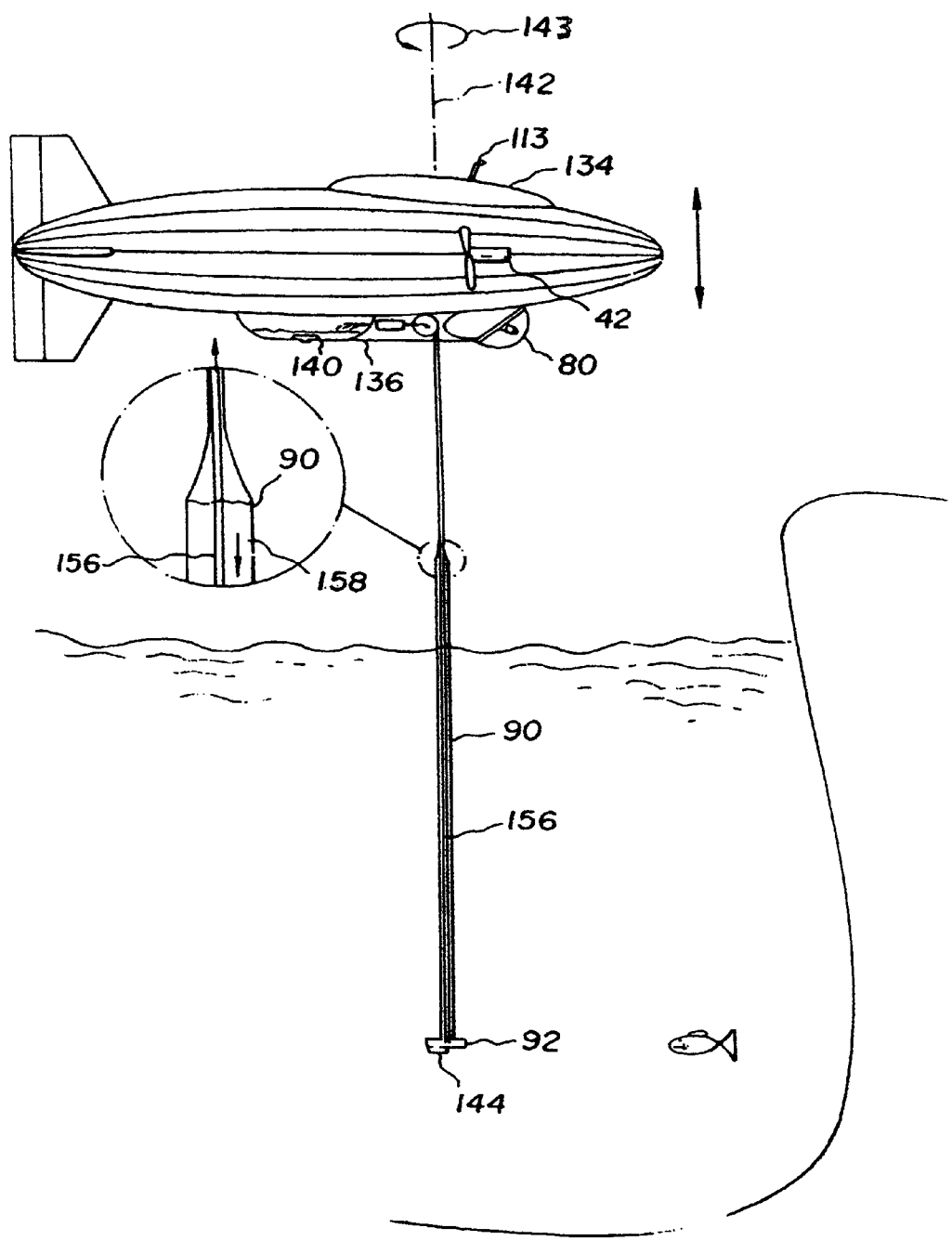
Figures 13, 14:
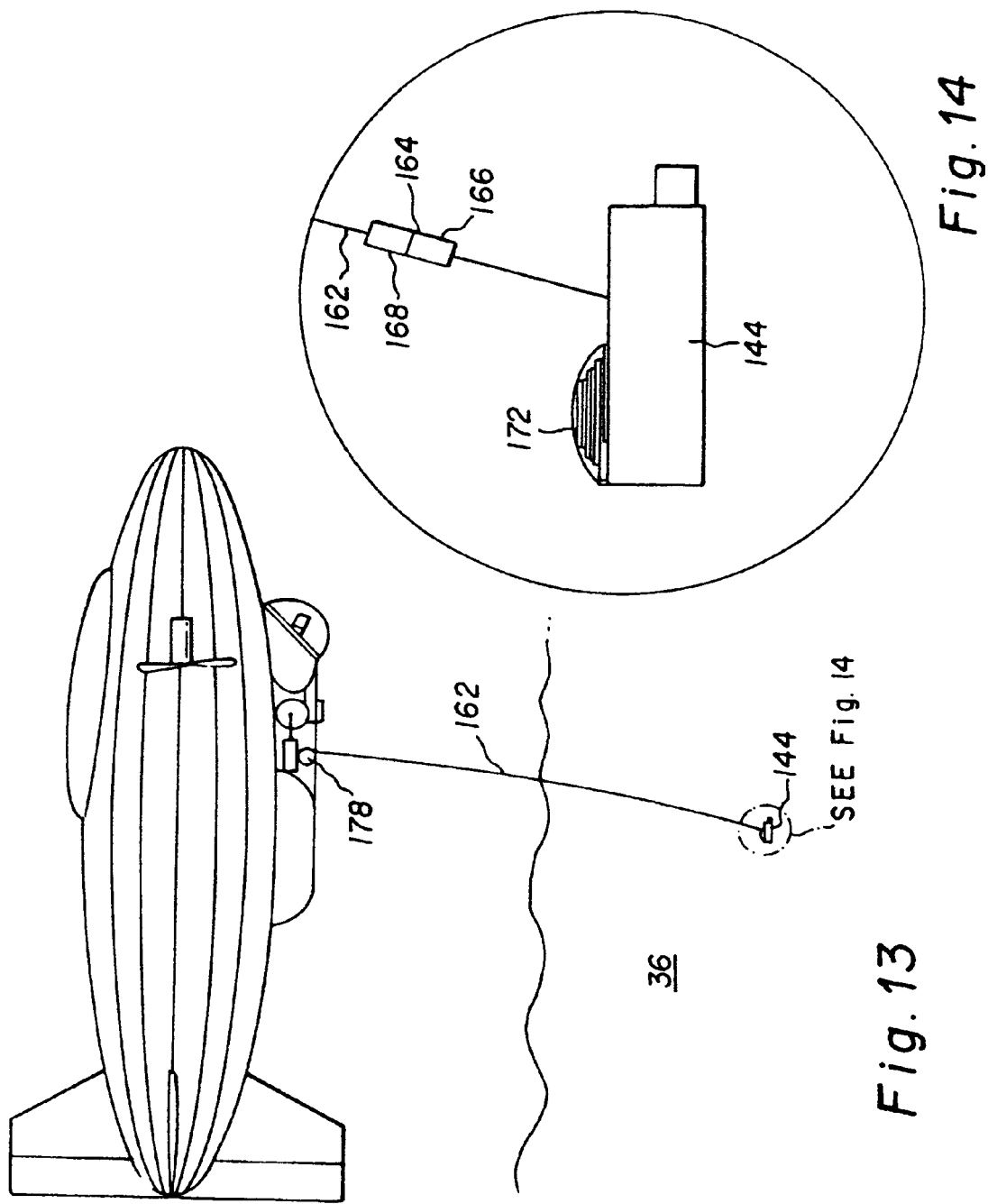
FIG. 13 is a side view of a remotely controlled non-tethering underwater camera on the novel lighter-than-air platform.
FIG. 14 is an enlarged view of the circled area of FIG. 13.

In the best mode snorkel 90 includes a flexible snorkel 156 within snorkel 90 (FIG. 10). The snorkel within a snorkel allows the detachable anchoring means and snorkeling of water aboard the airship to be more precisely controlled. As illustrated in FIG. 12 snorkel 90 together with pump 92 controls the level of column of water 158 in snorkel 90 which controls the altitude of novel airship 30 above the surface of water 136. Water 160 is then pumped into water ballonet 100 or 140 (140 shown in FIGS. 12A and 12B) for buoyancy control as heretofore described. As more water 156 is pumped into ballonet 140 and the weight of airship increases the level of column of water 158 in snorkel 90 decreases to decrease the weight of the airship to maintain novel airship 30 at the same height above the surface of water 36.

Referring now to FIGS. 4, 5, 13, 14, 15, 16, 17 and 18 the anti-tethering camera is illustrated. Tethering of novel airship 30 can result in the aircraft crashing due to the combination of close proximity to the ground and unexpected action of the wind together with a tether that causes the airship to act like a kite. As a result both land camera 84 (FIG. 4) and underwater camera 144 which may be mounted on snorkel 90 or on a separate cable 162 are designed to provide anti-tethering features. The anti-tethering feature includes a breakaway coupling 164 which is designed to separate into a male 166 and female 168 portion when tension on cable 162 reaches a predetermined level. The anti-tethering breakaway coupling 164 is also designed to separate on command from novel airship 30 by an electrical pulse 170 transmitted down cable 162 when the data acquisition means such as aerial cameras 80 provide visual images demonstrating the airship may contact the ground. The basic difference between land camera 84 and underwater camera 144 is that underwater camera 144 includes a water recovery system.

Figure 17:
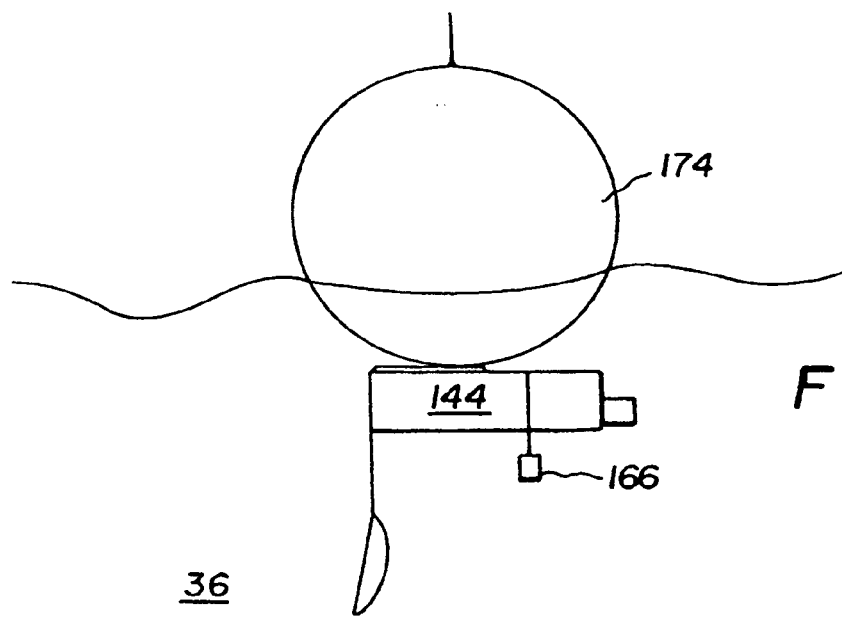
FIG. 17 is a side view illustrating the recovery position of the remotely controlled non-tethering camera of FIG. 13.
Figure 16:
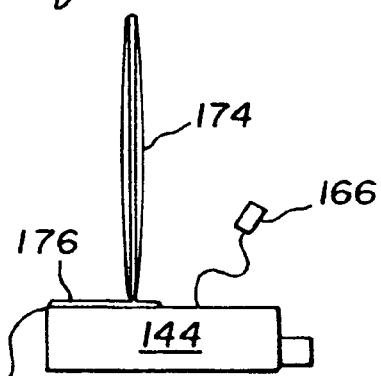
FIG. 16 is a side view of the recovery system for the remotely controlled non-tethering camera of FIG. 13.
Figure 15:
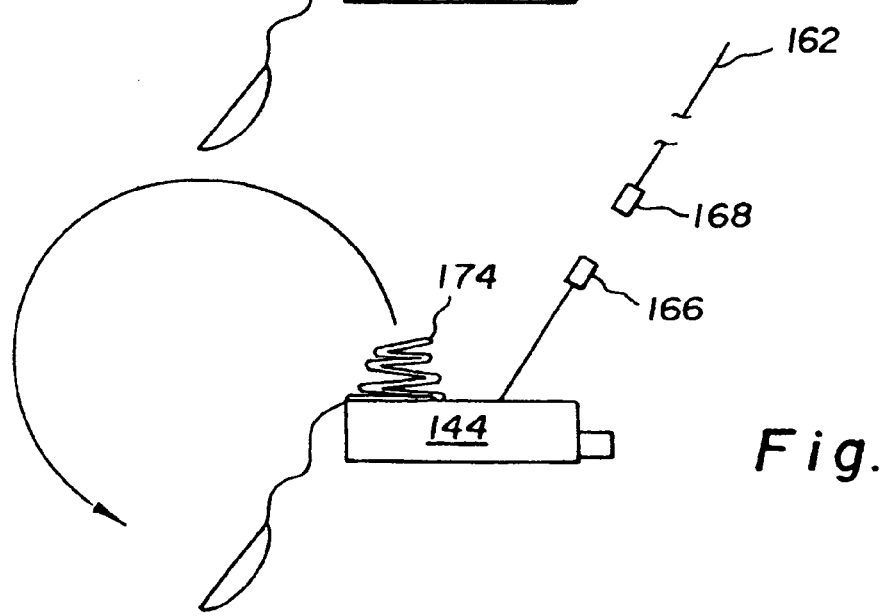
FIG. 15 is a side view of the activation of the recovery system for the remotely controlled non-tethering camera of FIG. 13.
Figure 18:
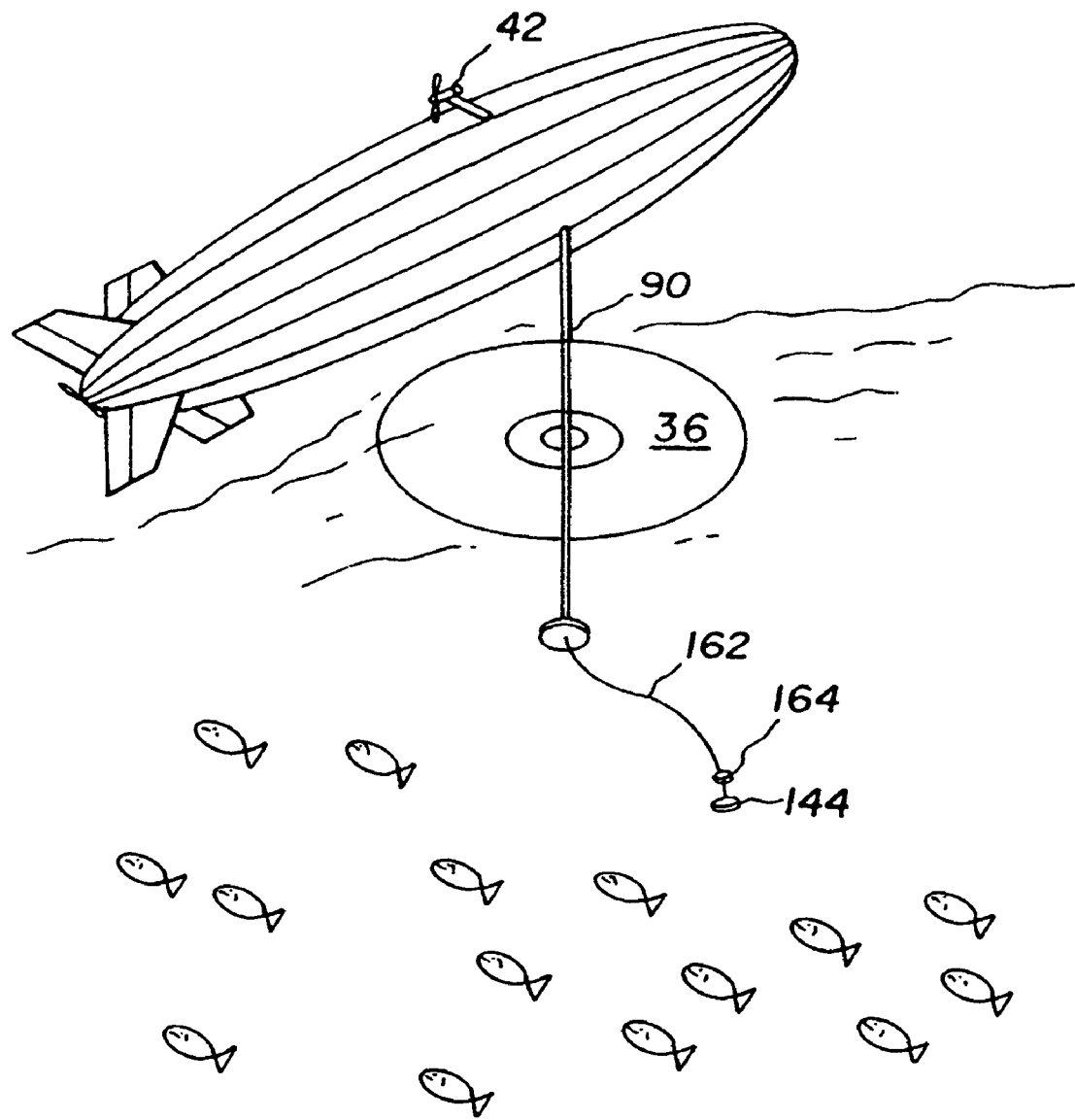
FIG. 18 is an underwater perspective view of a novel airship with a remotely controlled non-tethering camera mounted to the novel airship snorkel.
Figure 23:
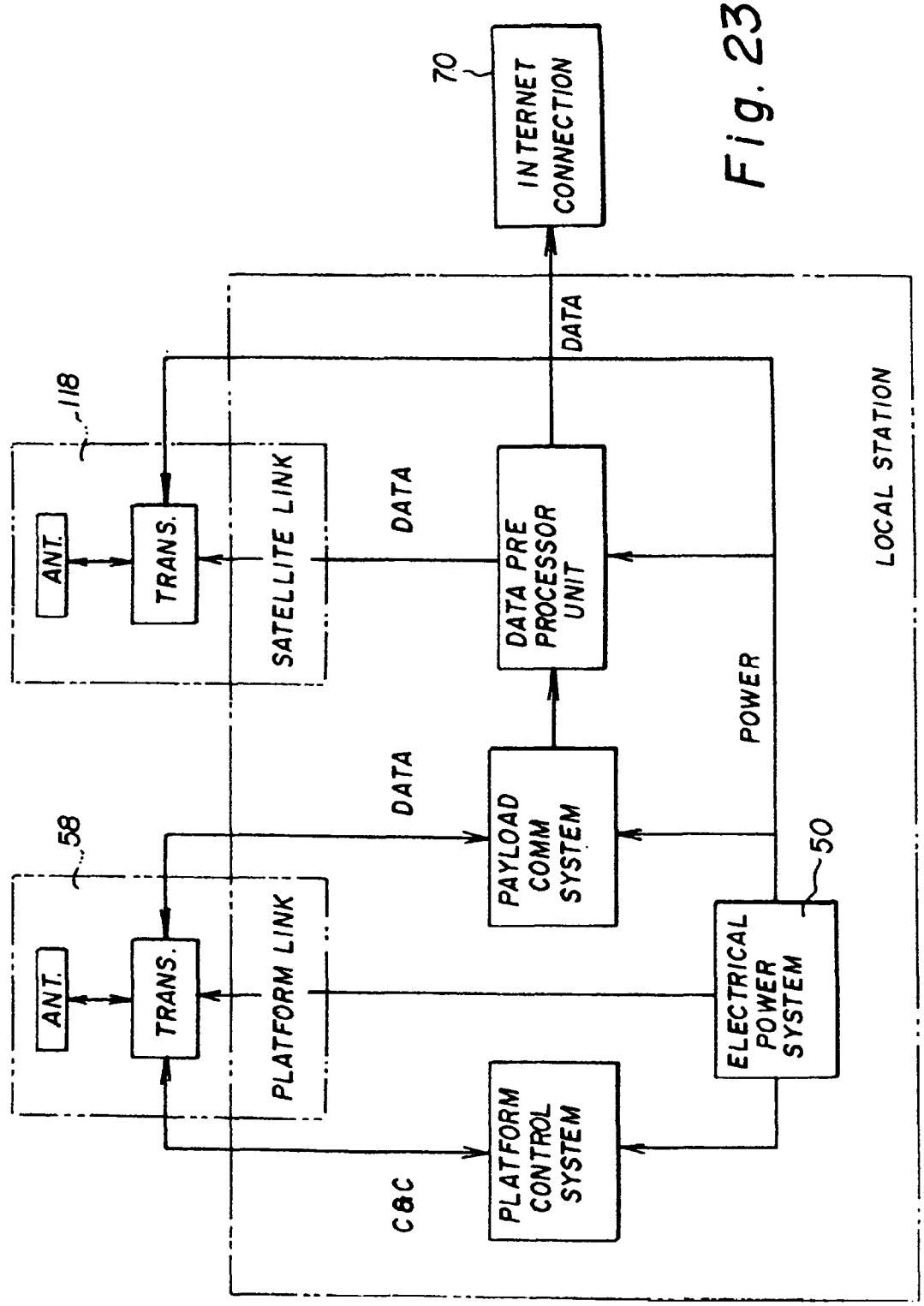
FIG. 23 is a diagrammatic illustration of the components of the local station component of the invention.
Figure 24:
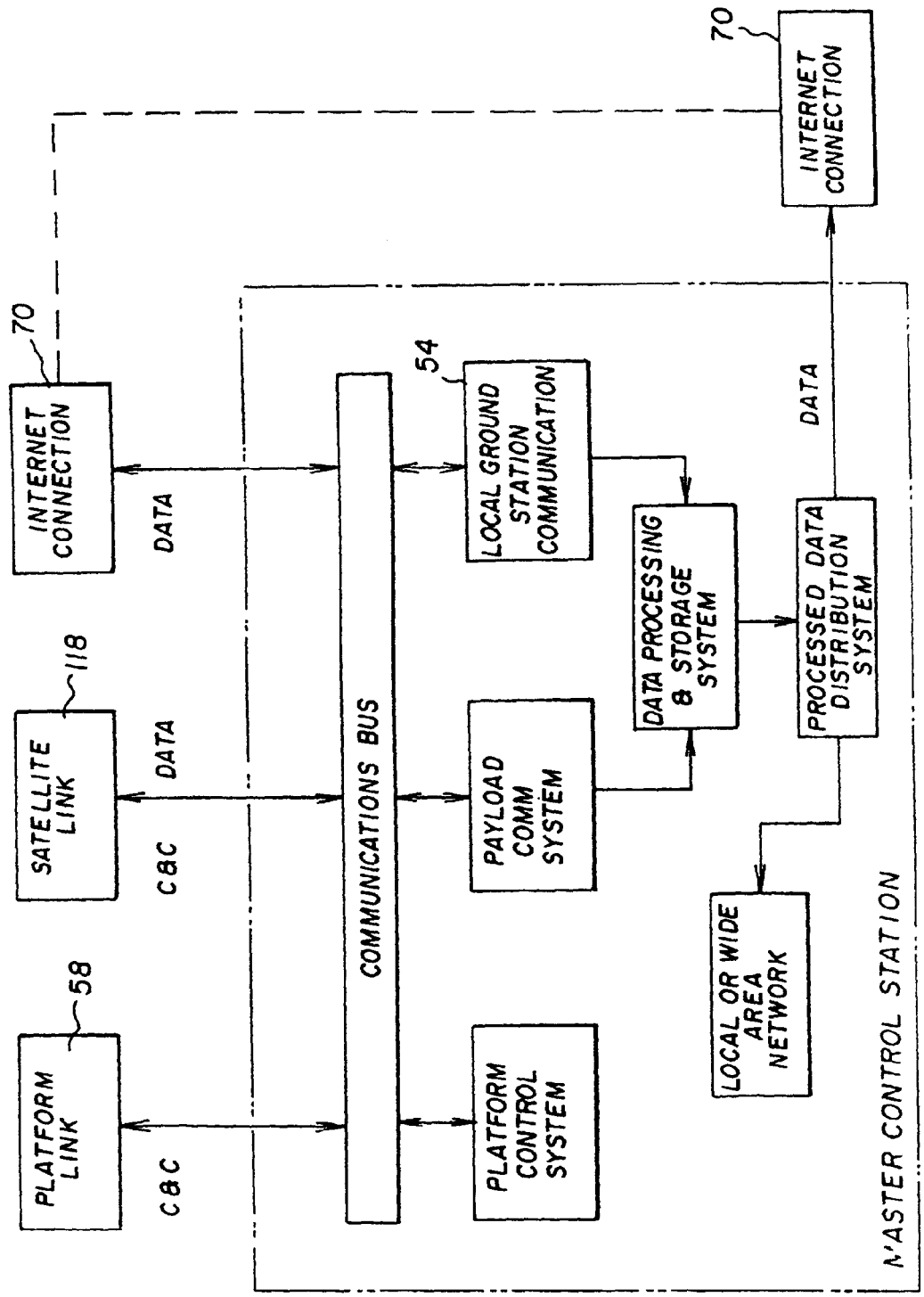
FIG. 24 is a diagrammatic illustration of the components of the master control station of the invention.

More particularly the underwater recovery system for underwater camera 144 includes a recovery capsule 172 which opens (FIG. 15) upon separation of breakaway coupling 164 to release a balloon 174 which is inflated by cartridge 176 (FIG. 16) to inflate balloon 174 and allow the recovery of camera 144 on the surface of water 36 (FIG. 17). Camera 144 may be removably attached to snorkel 90 (FIG. 18) or be mounted in housing 132 and deployed by a winch 178 (FIG. 130. Where substantially stationary underwater studies of reefs or aquatic life is involved camera 144 on snorkel 90 provides both buoyancy control and a detachable securing means. Where dolphins, whales or other constantly moving aquatic life is studied camera 144 on cable 162 (FIG. 13) may be employed to allow tracking of aquatic wildlife without the drag induced by snorkel 90.

Snorkel 90 is also designed to provide a securing mooring of novel airship 30 in water 36 in severe storms by allowing the flooding of ballonet 100 or 140 (FIG. 19). Where novel airship 30 is deployed in severe weather environments the use of ballonet 100 is preferred over ballonet 140 since the ballonet 100 provides a lower center of gravity allowing more of novel airship to be moored and more securely attached to the surface of water 36.

Referring now to FIGS. 20 and 21 an anti-tethering detachable securing means is illustrated for attachment to ground 34 in the form of an anchor 88. Anchor 88 is preferably composed of a bioerodable plastic material and is designed to be repeatedly deployed and retracted from housing 136 by winch 180. However, in cases where severe or sudden weather conditions or entanglement of anchor 88 on the ground 34 occurs, a breakaway device 182 is provided to prevent airship crashing into an object on the ground such as tree 184 where engines 38, 40 and 42 are unable to control the crash of airship 30 as determined in local station 54 from data inputs from aerial cameras 80.

The breakaway device 182 for anchor 88 is similar to the breakaway devices for camera 144 in function and operation. However, since anchor 88 is also intended like snorkel 90 to provide a detachable securement means for controlling the positive buoyancy of airship 30 at a predetermined maximum altitude, the amount of force required to separate male couple 186 from female couple 188 is many times greater. To compensate for the greater force required to separate male couple 186 from female couple 188 in cases where the ship is endangered, an electrical pulse 190 down anchor cable 192 can be utilized to separate cable 192 from anchor 88 to save airship 30.

The novel airship or LTA platform 30 is designed to circle around, hover over and continually fly in wind conditions back and forth over the area of interest continuously collecting streaming video images with audio, environmental and scientific data and transmitting it to the local ground station 54. The LTA platform 30 is preferably an unmanned robotic remote-controlled airship with an electronic payload providing for streaming video images with audio, environmental and scientific data collection devices with the telemetry command and control link 56 with local station 54 to provide for the safe operation of novel airship 30 as heretofore described.

The novel airship 30 is in the range of 5 to 50 meters long and can be any self-propelled aircraft that is lighter than air and includes a remotely activated retractable snorkel that cooperates with a buoyancy control system. The design and construction of the novel airship includes well known components such as an envelope and an electrical and mechanical control system as are commercially available from numerous sources such as Bosch Aerospace of Huntsville, Ala. The novel airship 30 is designed to be non-polluting and quiet as a result of its electrical power from power supply 50 that may be either batteries or a fuel cell that can be recharged by solar cells 46 affixed to the novel airship 30.

The novel airship 30 is equipped with an autonomous flight control system 112 that is connected to the TC&C link 56 with the local ground station 54 to provide for the remote operation of novel airship 30 by an operator in remote pilot station 194 in local station 54 (FIG. 25). The novel airship also includes special components such as quiet running electrical engines and propellers and novel components such as a retractable snorkel and water ballonet for assisting in the control of buoyancy and for use in special operating conditions to provide flexibility and advantages available in the ground based monitoring and high altitude monitoring systems of the prior art.

The TC&C link 56 is an independent Radio Frequency (RF) or Microwave (MW) bi-directional communications system that connects the flight control system onboard the LTA platform 30 to the remote pilot station 194 in the local ground station 54 and provides the remote pilots with a real-time broadcast-quality video of the terrain from one or more pilot's cameras 80 located in the front of payload housing 82. The TC&C data link 56 transmitted by this link from the LTA platform 30 consists of a continuous stream of video and flight-related information such as the current altitude, position and speed of the novel airship 30, power-related information such as the power remaining in the on-board power supply 50, current charging rate of the solar cell panel 46 and power consumption along with the health and operating status of on-board systems such as flight control and propulsion. The TC&C data transmitted from the local station 54 consists of an intermittent stream of commands from the ground operators directing the LTA platform 30 to a new position, change altitude, fly a new flight pattern or activate or de-activate cameras 144 or to retract or deploy snorkel 90 take on water 36 for buoyancy or deploy anchor 88.

The novel airship 30 is also equipped with a crash alarm 120 and transponder device for communicating signals similar to those used in commercial and private aviation, which automatically notifies the local station 54 if the airship 30 is tampered with or shot from the sky by poachers. The transponder is battery powered and will automatically transmit the coordinates of the airship so that a rescue team can hone in on the signal and find the airship and take steps to secure the wildlife under study and capture the intruders.

The electronic and instrument payload is carried in the instrument housing 134 on the top of the novel airship and communicates with cameras 80, 84 and 144 which include one or more high resolution, regular or low-light video cameras with microphones that have pan, tilt, and zoom capabilities and can be fitted with lens turrets that have a range of wide-angle, intermediate and telephoto lenses mounted on them. The data collected by these cameras consists of a continuous stream of digital broadcast quality television and audio data preferably in a High-Definition TV (HDTV) format. While transmission frequency varies from country to country 24 GHz is adequate for high resolution analog video.

Telex, Canon and Sony all make (or market under their name) transmitters for this purpose. A telex receiver has been tested. It is a diversity tuned multi channel receiver with 1 antenna per transmitter and 3 antennae on each receiver. The receiver "votes" on the best signal to noise ratio constantly and will dynamically switch between whichever antenna is best at the moment. This minimizes the usual dropouts caused by movement of either the transmitter or receiver, which is the result of a combination of things.

Dropouts result from but are not limited to short wavelength atmospheric absorption, multi path signal reception from a single transmission point and a combination of both resulting in phase angle (time) variations of the signals arrival times at the receiver antenna. This multiple signal arrival causes a "nulling" or adding of the signal delivered to the feed point of the receiver from the antenna system, the degree of which is dependant on this phase angle variation. Simulation and prediction of overall signal quality is difficult and is best evaluated on a site by site basis since an electromagnetic wave propagated in the atmosphere has many variables affecting the signal arrival times. In general increasing the "line of sight" power level from the transmitter with a confined "beam antenna" having minimal side lobe emission can minimize but not eliminate these effects. In addition one (or more) directional antennae at the receiver site can be used to "reject" off angle reflections from buildings and natural obstacles.

The payload carried in instrument housing 134 can also include a wide range of multi-spectral sensor units 104 which includes electro-optical passive and active devices selected and configured to suit various applications. Passive devices that record emissions from the earth's surface or the environment include a variety of scientific and environmental measuring devices such as infrared cameras and weather instruments that measure temperature, humidity and barometric pressure. Active devices that transmit a signal and record the echo include sophisticated radio, radar, microwave, infrared, and ultraviolet devices used for atmospheric and soil analysis, air and soil pollution measurement and terrain mapping. The data transmitted from the LTA platform 30 consists of both continuous and intermittent streams of scientific and environmental sensor data in an analog or preferably digital format.

Referring to FIGS. 5, 22, 23, 25 and 28A-C the relationship between the local station 54 to control and monitor the operation of platform 196 and in the case of novel airship 30 its course, altitude, speed and other flight-related activities as well as monitor the health and status of the cameras and devices on the platform and implement directives from the subscribers internet interface 74. Subscribers receive data either directly from the local station 54 through image processor 196 which also includes a data storage system 198 or through an optional master control station 62 as will be described hereinafter in greater detail.

The local station 54 can be either a fixed structure or a mobile vehicle large enough to house the required personnel and equipment for the particular application. Preferably it is located anywhere in the vicinity of where the LTA platform 30 is operating, up to a range of about 25 to 100 kilometers depending upon terrain conditions, so long as there is a an unobstructed "line-of-sight" between the LTA platform 30 and the local station 54 so the TC&C link 56 between the novel airship 30 and the local station 54 can operate properly. Where local station 54 is airborne such as through satellite 60 the limitations of terrain are removed and greater distances between the local station 54 and novel airship 30 are achieved. The local station 54 is configured with the appropriate antennae, transceivers and other equipment necessary to send, receive and temporarily store selected portions of the TC&C data and payload control commands.

Local ground station 54 also includes the appropriate antennae 200, transceivers and other equipment necessary to receive image data and sensor data from the LTA platform 30, buffer, compress and filter it through a preprocessor 204 and retransmit it via a satellite link 58 (FIG. 1) to subscriber interface 74 and preferably to a master control station 62. The local station 54 can either immediately retransmit the image and sensor data upon receipt or be configured with data storage system 198 to convert the data into a more manageable or suitable format prior to transmission or temporarily store the data for retransmission at a later date.

In the preferred embodiment of the invention the local station 54 is equipped with a means of communicating with the master control station 62 to receive instructions, a means of monitoring the local weather conditions so the operators can navigate the LTA platform 30 around storms, high winds and other adverse weather conditions and a means of communication with local authorities to notify them of any poachers or other abnormalities the LTA platform may observe. In the preferred embodiment as illustrated in FIGS. 22, 24, 26 and 28A-C the optional master control station 62 is the communications link between a local station 54 and an internet subscriber interface 74.

Master control station 62 is configured with a satellite link 206 through antenna 208 and a terrestrial link 210 so that it can receive the image data and sensor data from each of the LTA platforms 30 currently deployed. The master control station 62 includes a data processing and storage system 212 made up of one or more computers, on-line data storage subsystems and a network of workstations for the technicians to review, collate, analyze and otherwise process the data. The master control station also includes a processed data distribution system 214 that makes the data available to the subscribers via the Internet. The master control station 62 has the facilities to store all of the data collected over time to facilitate research and analysis of the data over long periods.

The video from the airship is delivered to the master control station via current technology, multi channel transceivers and is temporarily archived onto digital video tape because of its low cost, lack of complexity and high storage capability. At the same time "special events" (dams breaking, baby seals being killed, poaching activities, oil spills, etc.) can be simultaneously retransmitted by whatever "current technology affords at the time". From an operational standpoint however we need to go further in cataloging and archiving the data both from a video standpoint and a "data" perspective as well. This will enable us to build a local database of information needed to plot weather variations over time and provide time lapse images of interest. Currently this must be done manually.

The master control station 62 manages the subscribers and facilitates communication between subscribers and other interested parties such as local governments and corporate sponsors. The master control station 62 also receives and processes interactive requests from subscribers to observe various ecosystems, habitats or animal groups, evaluates them and instructs the local ground station 54 on where to deploy the LTA platform 30, where to focus the cameras, and what sensors to activate.

All of the processing can be completed at the master control station 62 in response to the requests of the subscribers so only complete images, streaming video; audio or digital data are sent or uploaded to the subscriber. This approach eliminates the need for the subscriber to have any special equipment or software to manipulate or process the data. While the master control station 62 can be located anywhere in the world, it would be more feasible to locate it in or near a major population center in a developed area where an adequate infrastructure (utilities, communications systems, Internet access, technical work force, etc.) already exists to support it.

Figure 27:
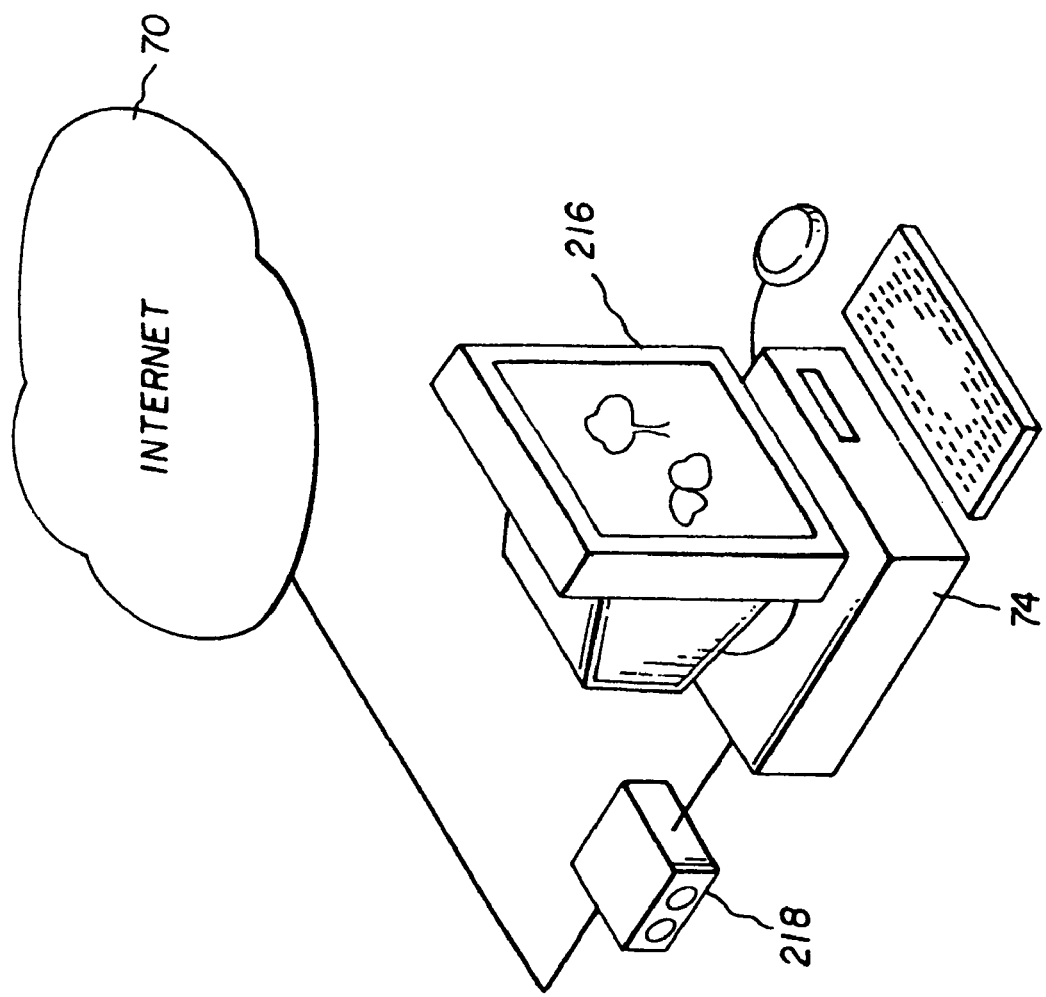
FIG. 27 is a perspective view of a subscriber interface to the system and method of the invention.
Figure 28A:
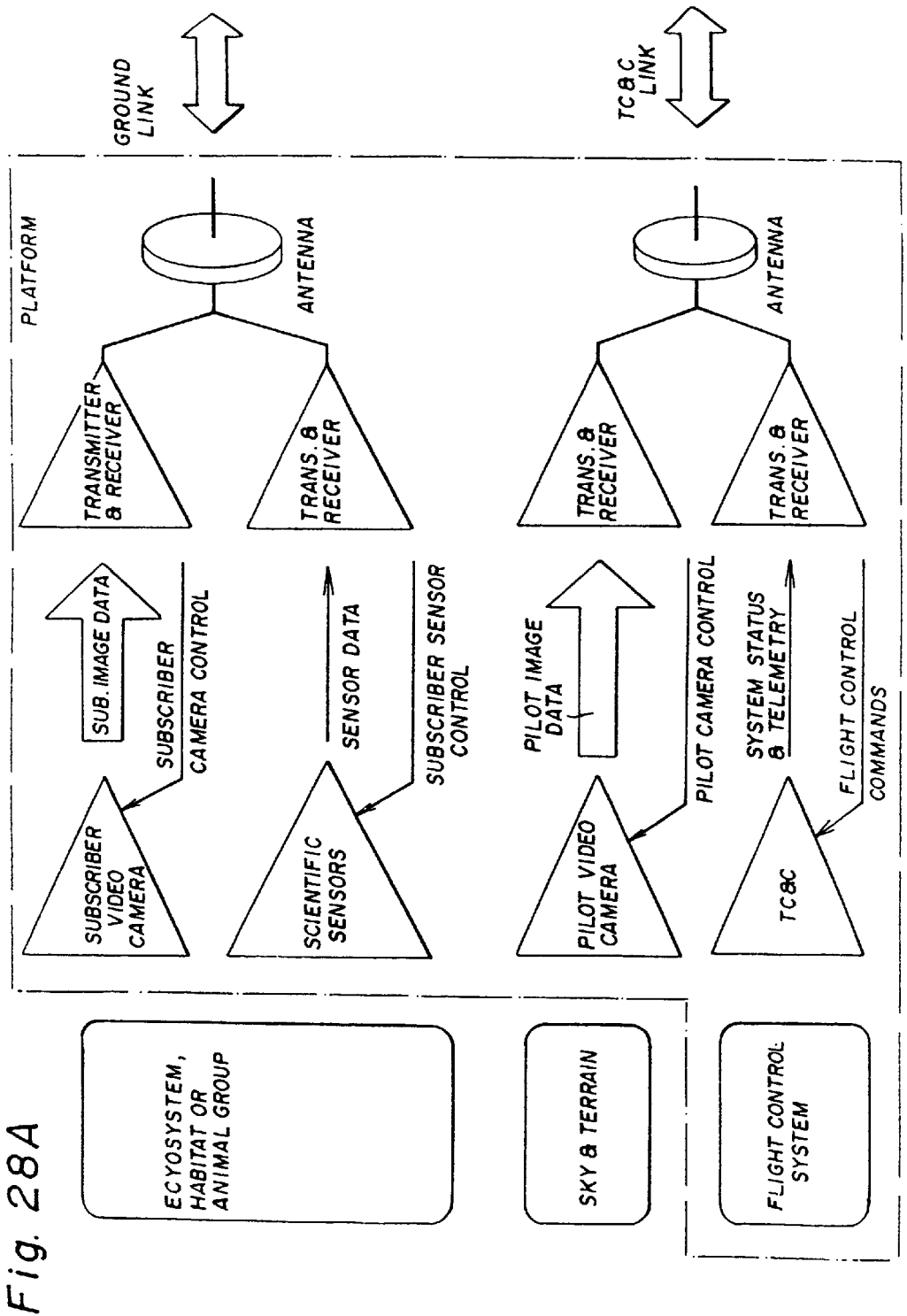
FIGS. 28A, B and C is a diagrammatic illustration of a data flow diagram in accordance with a preferred embodiment of the invention.
Figure 28B:
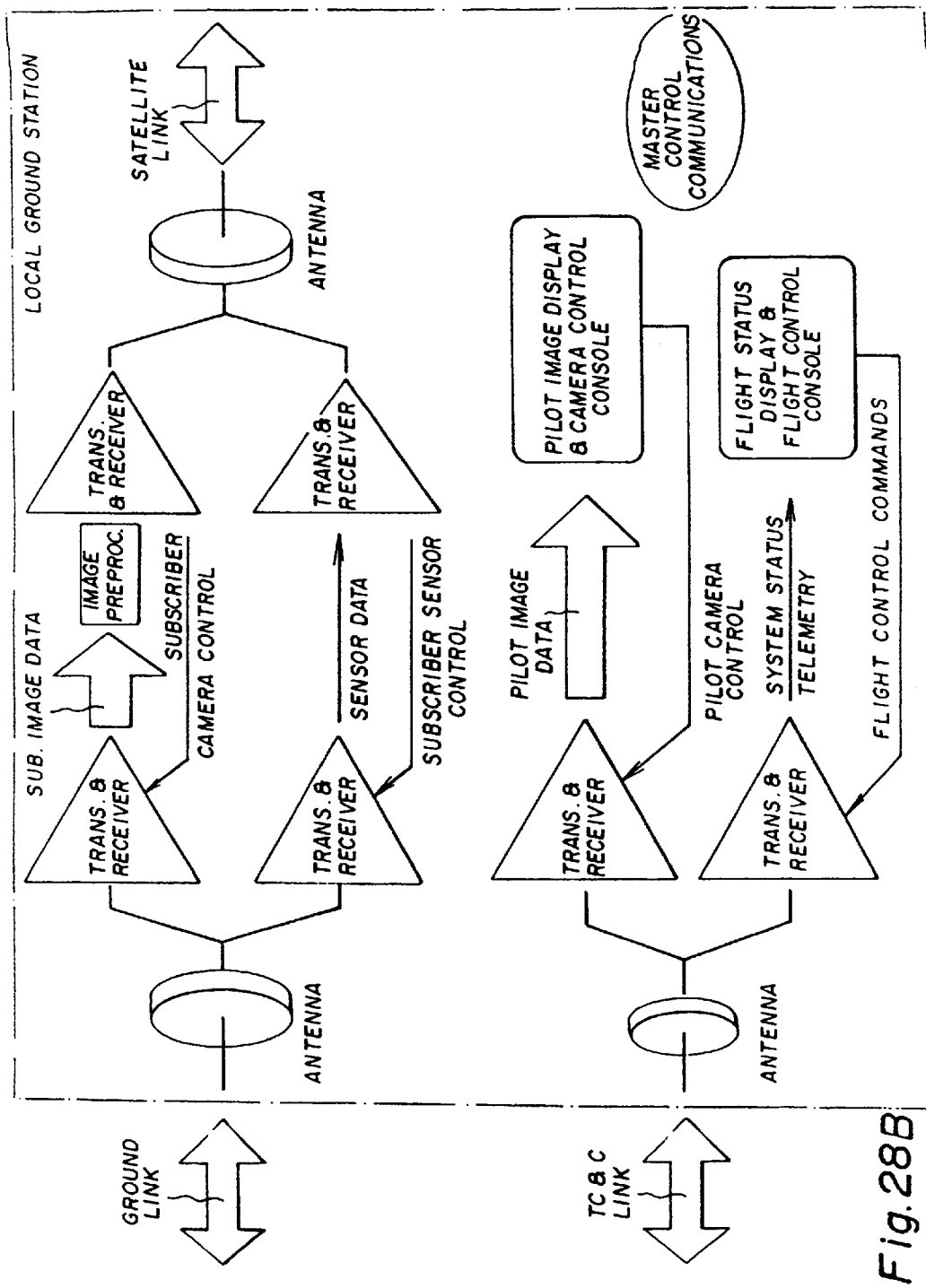
Figure 28C:
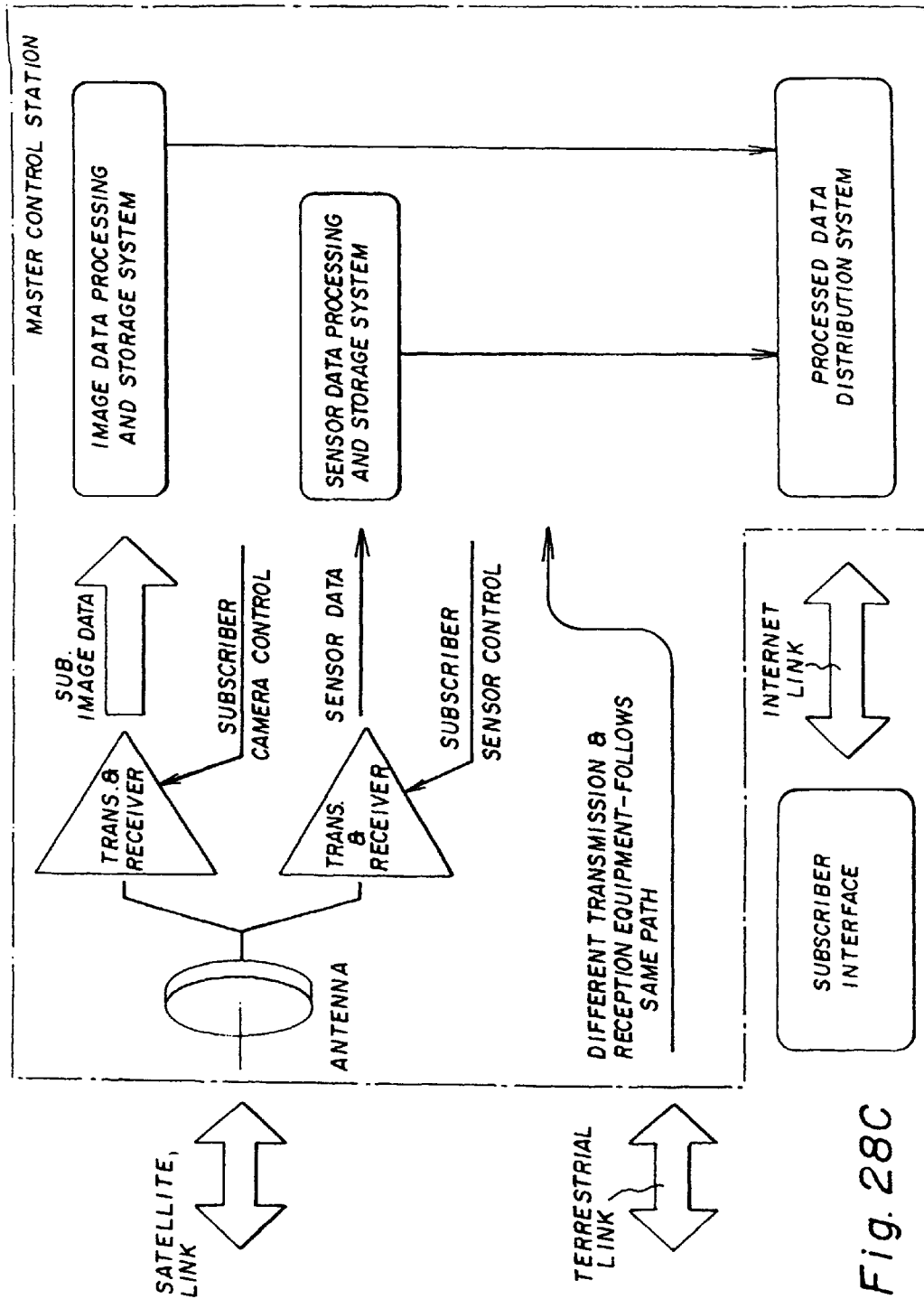

Referring to FIG. 27, the subscriber interface 74 enables the subscriber to view the image data and sensor data of the particular ecosystem, habitat or animal group of interest collected by the LTA platform 30 in near real time or research data previously collected with a personal computer monitor (PC) 216 equipped with common commercially available web browsers such as Netscape™ or Microsoft Internet Explorer™, and an Internet connection 218. The subscriber interface 74 is simple and easy to use so that special training is not required. Thus, not just specially trained scientists or environmentalists, but anyone including schools and school children with basic computer skills that know how to use a common web browser who obtains a subscriber ID and password can become a subscriber and access the data on a real time basis.

The subscriber can access, select, sort and view the data in different ways. For example, a subscriber can choose to view data the LTA platform 30 is currently collecting near real time or examine data that was collected earlier. The subscriber can also view video, infrared, radar, ultraviolet or any other type of data the LTA platform is equipped to collect. The different types of images can be viewed separately such as just video or just infrared or they can be combined by the computers at the master control station 62 into composite images such as video and infrared or radar and infrared.

The novel system and method of the invention utilizes a number of communication links to connect the components of the invention together and connect the ecosystem, habitat or animal group of interest at one end of the system to the subscriber at the other end. These communication links can be configured in different ways depending on the application and the areas of operation. In the preferred embodiment of the invention, a remote controlled platform provides data through a communications link with the remote controlled platform and provides a security system for protecting the remote controlled platform as well as the subject of the environmental study.

The telecommunications link includes an internet link for providing security to the platform and data provided by the platform. A ground link is established between the platform and the image data and the sensor data transmitted directly to the telecommunications station providing the telecommunications link. Preferably a master control station is provided between the telecommunications station and the observation platform to reduce the amount of equipment required in the telecommunications station.

In an alternate embodiment, a suitable broadband terrestrial link or a combination of terrestrial and satellite links can be used to transmit the data to a master control station in areas where a direct satellite link is unfeasible. In the preferred embodiment, the master control station is equipped with one or more Internet Servers and is a node on the Internet so that maintains the secure web site and the subscribers access the data directly at the source instead of through a third party web site.

In a further alternate embodiment, the LTA platform is configured with only a satellite link so the master control station can receive data and control the LTA platform directly without going through the local ground station. This arrangement is particularly advantageous where due to unstable political conditions or conditions of guerilla war exist making the existence of a local station dangerous or unfeasible. In such applications the satellite link can be used to control the novel remote controlled airship without endangering lives while at the same time providing data, information and world pressure to protect endangered species.

The novel method and system of the invention is susceptible to a wide variety of changes and modifications by those skilled in the art. The scope of the invention includes a broad system of novel components and subcomponents that may be modified or adapted for use in other applications and systems. The novel airship may be readily changed to a manned airship and utilized for purposes other than environmental monitoring and remote control utilizing the novel snorkel and snorkel mooring provided by the invention. The novel airship with snorkel assembly may be modified to carry groups of environmentalists and tourists to view reefs utilizing the snorkel and underwater camera assemblies or the novel airship may be modified as a pleasure craft which is moored like a boat when the water ballonet is flooded and operated as an airship when the water is pumped out of the ballast.

The novel retractable snorkel assembly may also be modified in a variety of ways to suit particular requirements and more than one snorkel assembly may be utilized to provide the advantages of the invention. The detachable securing means in the form of the breakaway anchor may similarly be modified as well as the use and modifications on the novel anti-tethering cameras.

The method and system of the invention may also be utilized in different environments to study land, water and air environments while providing data to scientists and subscribers of the novel system and components.

These and other such modifications as may be made by those skilled in the art are deemed to be within the scope of the appended claims.

As used herein and in the following claims, the word 'comprising' or 'comprises' is used in its technical sense to mean the enumerated elements include but do not exclude additional elements which may or may not be specifically included in the dependent claims. It will be understood such additions, whether or not included in the dependent claims, are modifications that both can be made within the scope of the invention. It will be appreciated by those skilled in the art that a wide range of changes and modification can be made to the invention without departing from the spirit and scope of the invention as defined in the following claims:

What is claimed is:

1. An airship snorkel device comprising:
   (a) a first flexible conduit having a first end connected to a water ballonet and a second end connected to a first water pump to provide a detachable anchor means to control altitude of a lighter-than-air aircraft and anchor said lighter-than-air aircraft in place on a surface of water;
   (b) a spool for extending and retracting said first flexible conduit;
   (c) a first water pump for pumping a liquid in said first flexible conduit to control the level of liquid in said first flexible conduit and control the altitude of said lighter-than-aircraft,
   (d) a second water pump disposed intermediate said water ballonet and said first end of said first flexible conduit;
   (e) a second flexible conduit having a first end and a second end disposed inside said first flexible conduit; and
   (f) a remote controlled device disposed on said first flexible conduit or on a lighter-than-air aircraft having said first flexible conduit and said first water pump to operate said first water pump and said spool for extending and retracting said flexible conduit to anchor said lighter-than-air aircraft in place on a surface of water.

2. The airship snorkel of claim 1 further comprising a motor for operating said spool.

3. The airship snorkel of claim 1 wherein said first flexible conduit is composed of a hydrophobic material.

4. The airship snorkel of claim 3 wherein said hydrophobic material is an elastomeric material.

5. The airship snorkel of claim 4 wherein said elastomeric material is rubber.

6. The airship snorkel of claim 5 wherein said elastomeric material is hypalon.

7. The airship snorkel of claim 1 wherein said second water pump is connected to the second end of said second flexible conduit.

8. The airship snorkel of claim 7 wherein said first end of said first flexible conduit and said first end of said second flexible conduit include a filter.

9. The airship snorkel of claim 1 further comprising a data acquisition device attached to said second end of said first flexible conduit.

10. The airship snorkel of claim 9 wherein said data acquisition device is an underwater camera and hydrophone combination.

11. The airship snorkel of claim 1 wherein said first and second flexible conduit and said spool for extending and retracting said first and second flexible conduit are housed in a housing.

12. The airship snorkel of claim 11 wherein said housing includes a water ballonet connected to said first end of said first flexible conduit.

13. The airship snorkel of claim 1 further comprising an underwater camera attached to said first flexible conduit.

14. The airship snorkel of claim 13 wherein said underwater camera is detachable from said first flexible conduit.

15. The airship snorkel of claim 14 wherein said underwater camera includes a recovery capsule.

* * * * *